United States Patent
Oshio et al.

(10) Patent No.: US 8,324,794 B2
(45) Date of Patent: Dec. 4, 2012

(54) PLASMA DISPLAY DEVICE

(75) Inventors: Shozo Oshio, Osaka (JP); Kazuhiko Sugimoto, Osaka (JP); Nobumitsu Aibara, Osaka (JP); Yoshihisa Nagasaki, Osaka (JP); Yukihiko Sugio, Osaka (JP); Masaaki Akamatsu, Osaka (JP)

(73) Assignee: Panasonic Corporation, Osaka (JP)

( * ) Notice: Subject to any disclaimer, the term of this patent is extended or adjusted under 35 U.S.C. 154(b) by 188 days.

(21) Appl. No.: 13/056,271

(22) PCT Filed: Jul. 14, 2010

(86) PCT No.: PCT/JP2010/004586
§ 371 (c)(1),
(2), (4) Date: Jan. 27, 2011

(87) PCT Pub. No.: WO2011/070692
PCT Pub. Date: Jun. 16, 2011

(65) Prior Publication Data
US 2011/0241534 A1    Oct. 6, 2011

(30) Foreign Application Priority Data

Dec. 10, 2009  (JP) ................................. 2009-280253
Dec. 10, 2009  (JP) ................................. 2009-280254

(51) Int. Cl.
*H01J 17/49* (2012.01)
*H01J 1/63* (2006.01)
(52) U.S. Cl. ................. 313/486; 313/487; 257/E33.059
(58) Field of Classification Search .......... 313/483–487, 313/512, 501–503, 498, 489, 468, 499; 257/89, 257/E33.059, 98–100, 79–81; 362/235, 227, 362/231, 293, 545, 800; 345/44, 46
See application file for complete search history.

(56) References Cited

U.S. PATENT DOCUMENTS 7,138,965 B2   11/2006  Shiiki et al.
7,786,659 B2   8/2010   Oaku et al.
(Continued)

FOREIGN PATENT DOCUMENTS
JP    2001-234165    8/2001
(Continued)

OTHER PUBLICATIONS

Hamada, et al., "Stereoscopic HDTV Display System with PDP", NHK Science & Technology Research Laboratories R & D, No. 71, Jan. 2002, pp. 26-35—partial translation.
(Continued)

*Primary Examiner* — Anh Mai
*Assistant Examiner* — Elmito Breval
(74) *Attorney, Agent, or Firm* — Hamre, Schumann, Mueller & Larson, P.C.

(57) ABSTRACT

The present invention provides a plasma display device that has light emission properties with short persistence where green light has a persistence time of 3.5 msec or less, that is excellent in luminance, luminance degradation resistance, and color tone, and that is suitable for, for example, a stereoscopic image display device. The present invention provides a plasma display device including a plasma display panel in which a pair of substrates at least whose front side is transparent are disposed to oppose each other so as to form a discharge space between the substrates, barrier ribs for dividing the discharge space into a plurality of discharge spaces are disposed on at least one substrate, electrode groups are disposed on the substrates so as to produce discharge in the discharge spaces divided with the barrier ribs, and a green phosphor layer that emits light by the discharge is provided, wherein the green phosphor layer includes a mixed phosphor containing a short persistence $Mn^{2+}$-activated green phosphor with a $\frac{1}{10}$ persistence time of more than 2 msec but less than 5 msec and either a $Ce^{3+}$-activated green phosphor or an $Eu^{2+}$-activated green phosphor that has a light emission peak in a wavelength range of not less than 490 nm and less than 560 nm.

9 Claims, 18 Drawing Sheets

U.S. PATENT DOCUMENTS

| | | |
|---|---|---|
| 7,833,436 B2 | 11/2010 | Shimooka et al. |
| 2006/0152135 A1 | 7/2006 | Choi et al. |
| 2009/0195141 A1 | 8/2009 | Song et al. |
| 2009/0206724 A1 | 8/2009 | Kim et al. |

FOREIGN PATENT DOCUMENTS

| | | |
|---|---|---|
| JP | 2001-329256 | 11/2001 |
| JP | 2003-045343 | 2/2003 |
| JP | 2003-142005 | 5/2003 |
| JP | 2006-193712 | 7/2006 |
| JP | 2006-312662 | 11/2006 |
| JP | 2007-056061 | 3/2007 |
| JP | 2008-034302 | 2/2008 |
| JP | 2008-138156 | 6/2008 |
| JP | 2009-059608 | 3/2009 |
| JP | 2009-185275 | 8/2009 |
| JP | 2009-185276 | 8/2009 |
| WO | 2009/104259 | 8/2009 |

OTHER PUBLICATIONS

Kim, et al., "High Performance Phosphors for Advanced PDPs", Proceedings in the 15$^{th}$ Int. Display Workshops, vol. 2, pp. 815-818, Dec. 2008.

PLASMA DISPLAY DEVICE

TECHNICAL FIELD

The present invention relates to a plasma display device, particularly to a plasma display device that is suitable for a stereoscopic image display and in which phosphors that have short persistence and are excellent in luminance, luminance degradation resistance, and color purity are used.

BACKGROUND ART

Since plasma display devices with plasma display panels (hereinafter referred to as PDPs or panels) used therein allow higher definitions and bigger screens to be obtained, for example, 100-inch class television receivers increasingly are being produced commercially.

A PDP is composed of a front panel and a rear panel. The front panel includes a sodium borosilicate glass substrate, display electrodes formed on one principal surface thereof, a dielectric layer that covers the display electrodes and functions as a capacitor, and a protective layer formed of magnesium oxide (MgO) on the dielectric layer.

On the other hand, the rear panel includes a glass substrate provided with pores for exhaust and sealing a discharge gas, address electrodes formed on one principal surface thereof, an underlying dielectric layer that covers the address electrodes, barrier ribs formed on the underlying dielectric layer, phosphor layers that are formed between the respective barrier ribs and in which phosphor particles that emit red, green, and blue lights, respectively, are stacked.

The peripheries of the front panel and the rear panel are sealed together with a sealant member while their surfaces with the electrodes formed thereon oppose each other. In the discharge spaces divided by barrier ribs, a mixed gas of neon (Ne) and xenon (Xe) as a discharge gas is sealed at a pressure of 55 kPa to 80 kPa.

In a PDP, a video signal voltage is applied selectively to display electrodes to allow a discharge gas to be discharged and thereby ultraviolet light produced by the discharge excites the respective color phosphors to allow them to emit red, green, and blue lights. Thus, a color image display is obtained.

In the phosphor layers of respective colors, phosphor particles of respective colors are stacked. General examples of the phosphor materials for the phosphor particles include $(Y,Gd)BO_3:Eu^{3+}$ (hereinafter referred to as a YGB phosphor), $Y(P,V)O_4:Eu^{3+}$ (hereinafter referred to as a YPV phosphor), and $Y_2O_3:Eu^{3+}$ (hereinafter referred to as a YOX phosphor) as red phosphors, $Zn_2SiO_4:Mn^{2+}$ (hereinafter referred to as a ZSM phosphor), $YBO_3:Tb^{3+}$ (hereinafter referred to as a YBT phosphor), and $(Y,Gd)Al_3(BO_3)_4:Tb^{3+}$ (hereinafter referred to as a YAB phosphor) as green phosphors, and $BaMgAl_{10}O_{17}:Eu^{2+}$ (hereinafter referred to as a BAM phosphor) as blue phosphors.

On the other hand, recently, an improvement in definition in, for example, full specification high-vision and application of PDPs to stereoscopic image displays are taking place along with an increase in screen size of, for example, television sets with PDPs used therein. Particularly, PDPs are easy to drive at a higher speed as compared to liquid crystal panels. Therefore, for example, stereoscopic image display devices, each of which includes a combination of a PDP and liquid crystal shutter glasses, are being developed actively. As described in, for example, Non-Patent Literature 1, it is important that phosphors used for such stereoscopic image display devices exhibit shorter persistence times as compared to those used for ordinary image display devices.

With respect to the persistence time of phosphors, Patent Literatures 1 to 5 and Non-Patent Literature 2 describe green phosphors.

These literatures disclose various green phosphors with shorter persistence times than that of the ZSM phosphor and examples of mixed phosphors containing them mixed with ZSM phosphors. Furthermore, they disclose examples in which an increase in the amount of Mn activator in the ZSM phosphor, $MgAl_2O_4:Mn^{2+}$ or the like results in a decrease in luminance, luminous efficiency, lifetime properties and the like, but can shorten the persistence time.

CITATION LIST

Patent Literature

Patent Literature 1 JP 2006-193712 A
Patent Literature 2 JP 2003-142005 A
Patent Literature 3 JP 2008-34302 A
Patent Literature 4 JP 2009-59608 A
Patent Literature 5 JP 2009-185276 A

Non-Patent Literature

Non-Patent Literature 1 Koichi HAMADA et al., NHK GIKEN R&D, No. 71 (2002) pp. 26-35.
Non-Patent Literature 2 Y. C. Kim et al., Proceedings of The 15th Int. Display Workshops Vol. 2 (Dec. 4, 2008) pp. 815-818.

SUMMARY OF INVENTION

Technical Problem

In order to increase definition and apply PDPs to stereoscopic image displays, it is necessary to drive PDPs at high speed. Accordingly, while luminance and chromaticity as well as lifetime properties are satisfied, a further shorter persistence is required.

In a stereoscopic image display device with a PDP combined with liquid crystal shutter glasses, in order to prevent crosstalk that causes double vision of an image from occurring, the 1/10 persistence, which is a persistence time of a phosphor, (hereinafter, the persistence time refers to the 1/10 persistence time unless otherwise noted) is required to be 3.5 msec or less, desirably 3.0 msec or less due to the response time of the liquid crystal shutter glasses.

However, in stereoscopic image display devices in which a conventional ZSM phosphor containing a smaller amount of Mn activator, YBT phosphor, or YAB phosphor that is excellent in luminance and color purity is used for the green phosphor, the green phosphor has a long persistence time, specifically, at least 5 msec. Furthermore, the green phosphor has high spectral luminous efficacy. Therefore, crosstalk tends to occur and tends to be conspicuous, which has been a problem.

Furthermore, it also is possible to shorten the persistence time to approximately 4 msec by mixing a conventional ZSM phosphor with, for example, $Y_3Al_5O_{12}:Ce^{3+}$ (hereinafter referred to as a YAG phosphor) as a green phosphor with a shorter persistence time than that of the conventional ZSM phosphor. However, in this case, since the mixing ratio of the YAG phosphor having an inferior green color purity increases, the green color purity of emission light decreases and thereby the image quality deteriorates, which also has been a problem.

A shorter persistence time for the ZSM phosphor can be achieved by increasing the amount of Mn activator in the ZSM phosphor. However, an increase in the amount of Mn activator not only decreases luminance but also degrades the chemical stability of the materials and thereby tends to cause luminance degradation in the case of prolonged lighting. As a result, a problem arises that, for example, a green or white color shift is induced and luminance or chromaticity varies irregularly with respect to lighting time. This tendency becomes more conspicuous as the persistence time of the short persistence ZSM phosphor decreases, particularly, to less than 5 msec. Therefore, short persistence ZSM phosphors whose persistence time is less than 5 msec, particularly less than 4 msec, never have been used practically.

The present invention is intended to solve such problems and to provide a plasma display device that has light emission properties with short persistence where green light has a persistence time of 3.5 msec or less, that is excellent in luminance, luminance degradation resistance, and color tone, and that is suitable for, for example, a stereoscopic image display device.

Solution to Problem

In order to achieve the aforementioned object, a plasma display device of the present invention includes a plasma display panel in which a pair of substrates at least whose front side is transparent are disposed to oppose each other so as to form a discharge space between the substrates, barrier ribs for dividing the discharge space into a plurality of discharge spaces are disposed on at least one of the substrates, electrode groups are disposed on the substrates so as to produce discharge in the discharge spaces divided with the barrier ribs, and a green phosphor layer that emits light by the discharge is provided. In this case, the green phosphor layer contains a mixed phosphor containing a short persistence $Mn^{2+}$-activated green phosphor with a $\frac{1}{10}$ persistence time of more than 2 msec but less than 5 msec and either a $Ce^{3+}$-activated green phosphor or an $Eu^{2+}$-activated green phosphor that has a light emission peak in a wavelength range of not less than 490 nm and less than 560 nm.

Advantageous Effects of Invention

The present invention can provide a plasma display device that has a high luminance, excellent color image quality, and excellent lifetime properties with less luminance degradation even in the case of prolonged lighting and that is suitable for, for example, a stereoscopic image display device.

DESCRIPTION OF EMBODIMENTS

Hereinafter, an embodiment of the present invention is described with reference to the drawings.

Embodiment

1. Configuration of Plasma Display Device

Figure 1:
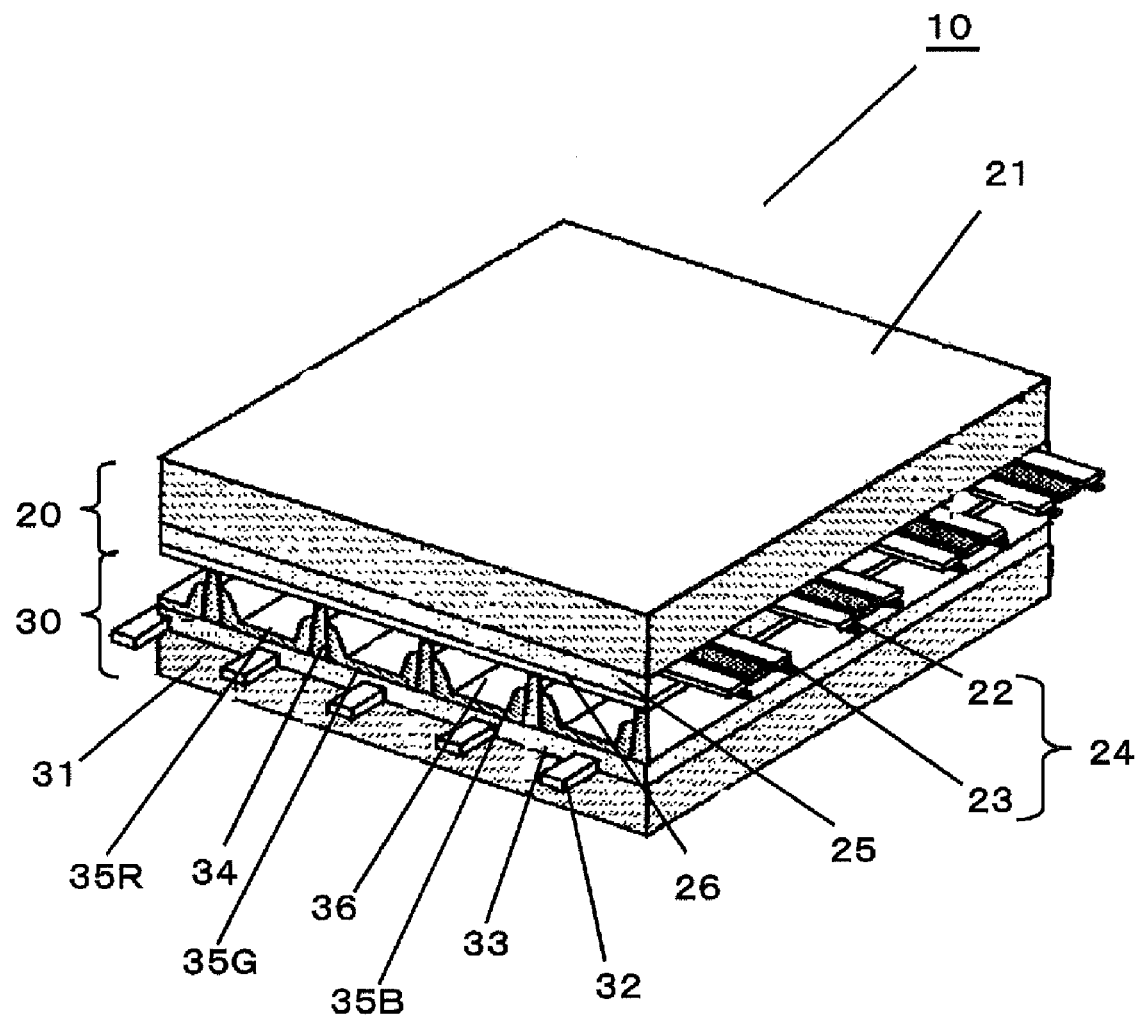
FIG. 1 is a cross-sectional perspective view showing the configuration of a PDP of a plasma display device according to an embodiment.

FIG. 1 is a cross-sectional perspective view showing the configuration of a PDP 10 of a plasma display device 100 according to an embodiment. The PDP 10 is configured with a front panel 20 and a rear panel 30. The front panel 20 includes a front glass substrate 21, on which a plurality of display electrode pairs 24 are formed, with each of the display electrode pairs 24 being composed of a scan electrode 22 and a sustain electrode 23 that are disposed in parallel with each other. A dielectric layer 25 is formed so as to cover the scan electrodes 22 and the sustain electrodes 23, and a protective layer 26 is formed on the dielectric layer 25.

On the other hand, the rear panel 30 includes a rear glass substrate 31, on which a plurality of address electrodes 32 arranged in parallel with one another are formed. Furthermore, an underlying dielectric layer 33 is formed so as to cover the address electrodes 32, and barrier ribs 34 are formed thereon. Red phosphor layers 35R, green phosphor layers 35G, and blue phosphor layers 35B that emit respective red, green, and blue lights are provided sequentially on the side faces of the barrier ribs 34 and on the underlying dielectric layer 33 while corresponding to the address electrodes 32.

The front panel 20 and the rear panel 30 are disposed to oppose each other in such a manner that the display electrode pairs 24 and the address electrodes 32 cross over each other, with minute discharge spaces being interposed therebetween. The outer peripheries thereof are sealed together with a sealing member such as a glass frit. A mixed gas of, for example, neon (Ne) and xenon (Xe) is sealed as a discharge gas in the discharge spaces at a pressure of 55 kPa to 80 kPa.

The discharge spaces are divided into a plurality of compartments by the barrier ribs 34. Discharge cells 36 are formed in the portions where the display electrode pairs 24 and the address electrodes 32 cross over each other. A discharge voltage applied between the above-mentioned electrodes produces discharge inside the discharge cells 36. The phosphors of the red phosphor layers 35R, the green phosphor layers 35G, and the blue phosphor layers 35B located inside the respective discharge cells 36 are excited by ultraviolet light generated by the discharge to emit light and thereby a color image is displayed. In this case, the configuration of the PDP 10 is not limited to that described above. For example, in the PDP 10, the barrier ribs may have a grid structure.

Figure 2:
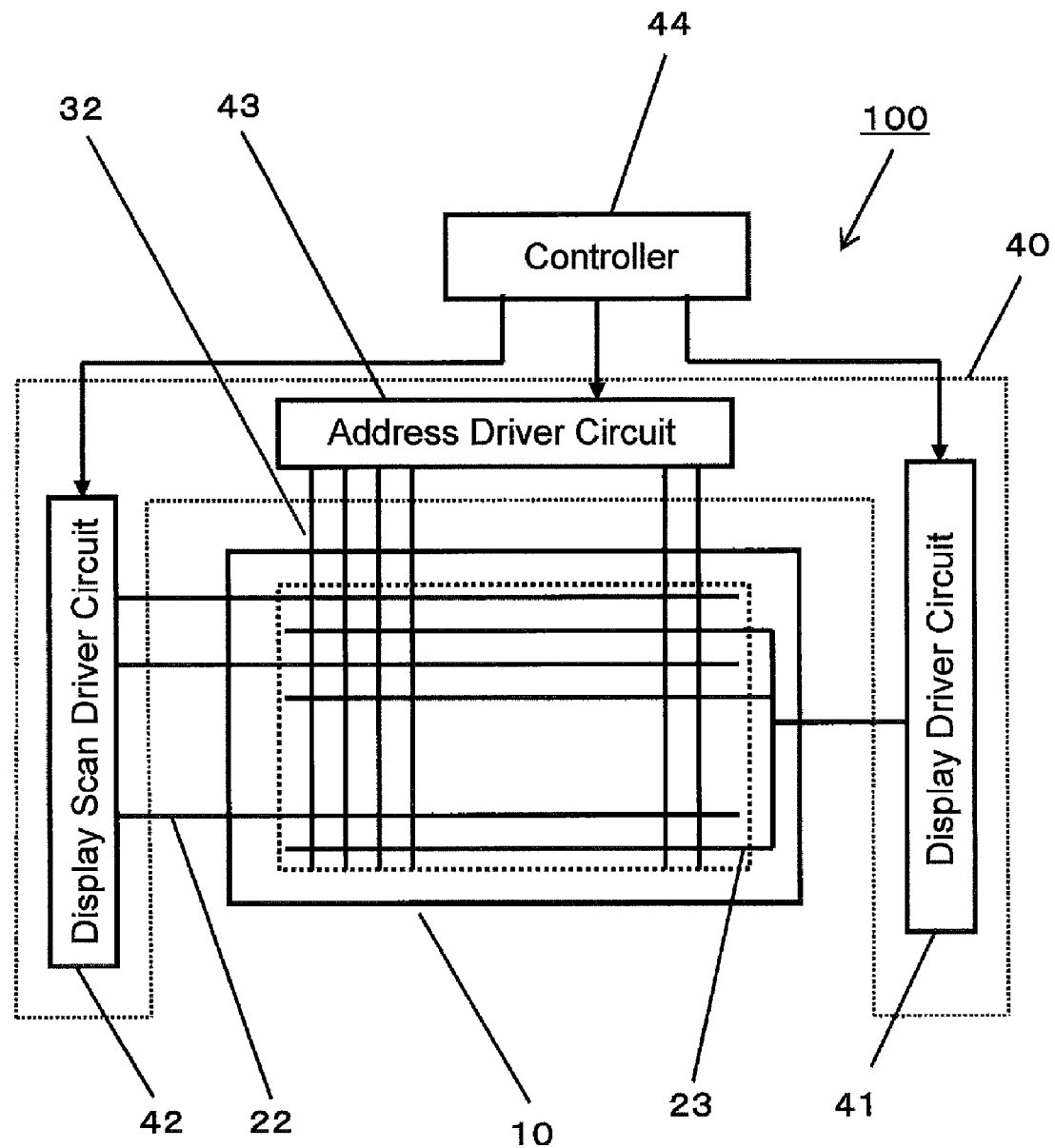
FIG. 2 is a schematic view showing the configuration of a plasma display device including the PDP used therein.

FIG. 2 is a diagram showing the configuration of the plasma display device 100 including the PDP 10 used therein. The plasma display device 100 includes the PDP 10 and a drive circuit 40 connected thereto. The drive circuit 40 includes a display driver circuit 41, a display scan driver circuit 42, and an address driver circuit 43 that are connected to the sustain electrodes 23, the scan electrodes 22, and the address electrodes 32 of the PDP 10, respectively. Furthermore, a controller 44 controls driving voltages to be applied to these respective electrodes.

Next, the discharge operation in the PDP 10 is described. First, a predetermined voltage is applied to the scan electrodes 22 and the address electrodes 32 that correspond to discharge cells 36 to be lighted and thereby an address discharge is produced. This forms wall charges in the discharge cells 36 that correspond to display data. Thereafter, a sustained discharge voltage is applied between the sustain electrodes 23 and the scan electrodes 22 to produce sustained discharges in the discharge cells 36 with the wall charges formed therein and thereby ultraviolet light is produced. The phosphors contained in the red phosphor layers 35R, the green phosphor layers 35G, and the blue phosphor layers 35B are excited by the ultraviolet light to emit lights and thereby the discharge cells 36 are lighted. An image is displayed according to a combination of lighted and non-lighted discharge cells 36 of respective colors.

Figure 3:
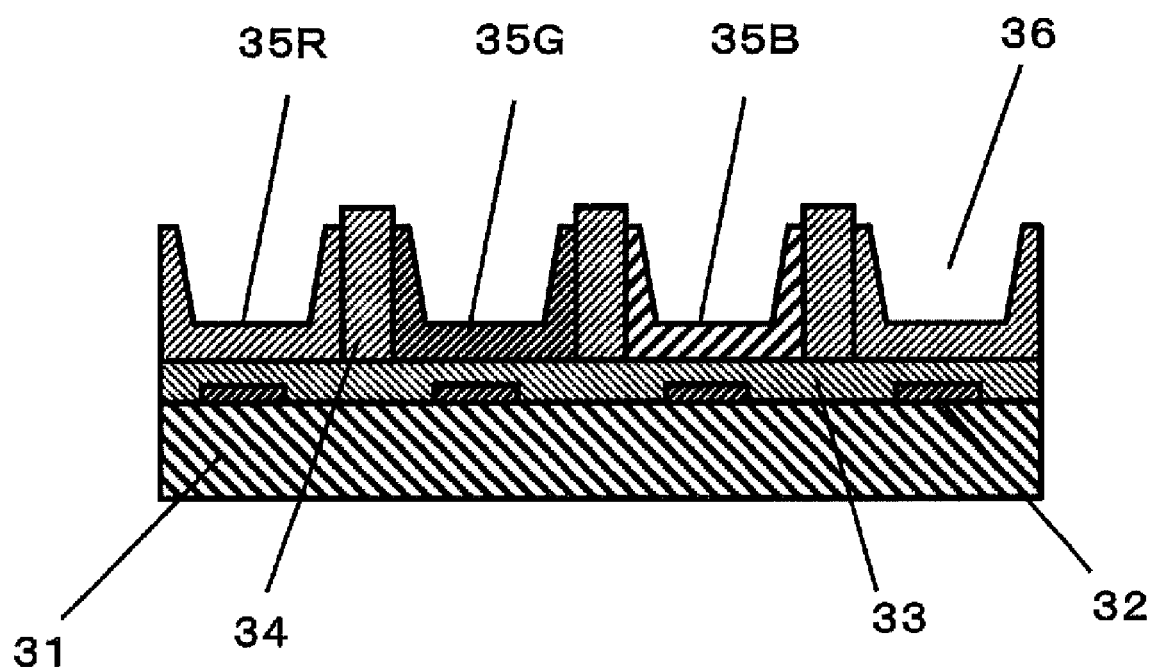
FIG. 3 is a sectional view showing the configuration of a rear panel of the PDP.

Next, the configuration of the rear panel 30 of the PDP 10 according to the embodiment and a method of producing it are described with reference to FIG. 3. FIG. 3 is a sectional view showing the configuration of the rear panel 30 of the PDP 10 according to this embodiment. A silver paste for electrodes is screen-printed on the rear glass substrate 31 and then is fired, so that a plurality of address electrodes 32 are formed in a striped shape. A paste containing a glass material is applied by a die coating method or a screen printing method so as to cover the address electrodes 32 and is then fired. Thus, the underlying dielectric layer 33 is formed.

The barrier ribs 34 are formed on the underlying dielectric layer 33 thus formed. Examples of the method of forming the barrier ribs 34 include one in which a paste containing a glass material is applied repeatedly in a striped shape by a screen printing method, with the address electrodes 32 being interposed therebetween, and is then fired. In addition, there also is, for example, a method in which a paste is applied onto the underlying dielectric layer 33, with the address electrodes 32 being covered with a masking material, and is patterned, which is then fired. These barrier ribs 34 divide the discharge space and thereby the discharge cells 36 are formed. The gaps between the respective barrier ribs 34 each are, for example, 130 µm to 240 µm in accordance with 42-inch to 50-inch full HD television sets and HD television sets.

Pastes containing particles of respective phosphor materials are applied to grooves between two adjacent barrier ribs 34 by the screen printing method, the ink-jet method, or the like and are then fired to form the red phosphor layers 35R, the green phosphor layers 35G, and the blue phosphor layers 35B. The phosphors used for the respective red phosphor layers 35R, green phosphor layers 35G, and blue phosphor layers 35B are described in detail later.

The rear panel 30 produced in this manner and the front panel 20 with the display electrode pairs 24, the dielectric layer 25, and the protective layer 26 formed therein are superposed to oppose each other in such a manner that the scan electrodes 22 of the front panel 20 and the address electrodes 32 of the rear panel 30 are orthogonal to each other. A sealing glass then is applied to their peripheral parts to seal the front panel 20 and the rear panel 30 together. Then, once the inside of the discharge space is exhausted to high vacuum, a mixed gas of, for example, neon (Ne) and xenon (Xe) is sealed therein at a pressure of 55 kPa to 80 kPa. Thus, the PDP 10 of this embodiment is produced.

The drive circuit 40 is connected to the PDP 10 thus produced and further, for example, a housing is placed. Thus, the plasma display device 100 is produced.

2. Configuration of Stereoscopic Image Display Device

Figure 4A:
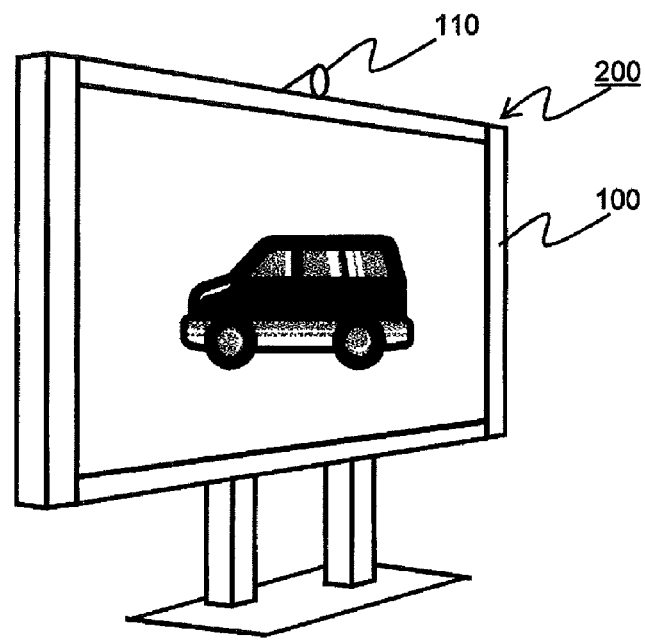
FIG. 4A is a perspective view showing an example of a stereoscopic image display device including the plasma display device of the embodiment used therein.
Figure 4B:
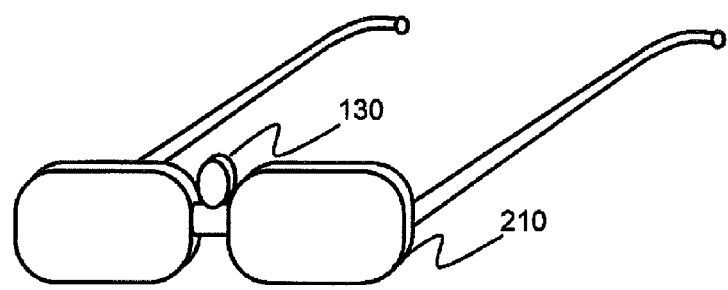
FIG. 4B is a perspective view showing the appearance of image viewing glasses that are used for viewing images displayed by the stereoscopic image display device.

Next, the case where such a plasma display device 100 is used for a stereoscopic image display device 200 is described. FIG. 4A is a perspective view showing an example of the stereoscopic image display device 200 including a plasma display device 100 used therein. FIG. 4B is a perspective view showing the appearance of image viewing glasses 210 that are used for viewing images displayed by the stereoscopic image display device 200. When a viewer views images displayed on the display surface of the stereoscopic image display device 200 through the image viewing glasses 210, the images can be viewed as stereoscopic images.

That is, the stereoscopic image display device 200 displays images for the left eye and those for the right eye alternately on the display surface. The image viewing glasses 210 are synchronized with images output onto the display surface of the stereoscopic image display device 200 and thereby control lights that enter the left eye and the right eye of the image viewing glasses 210, respectively, with a liquid crystal shutter that serves as an optical filter. An image for the left eye and an image for the right eye differ from each other by parallax. The viewer perceives the parallax based on the images viewed by the left eye and the right eye and can perceive that the images displayed by the stereoscopic image display device 200 are stereoscopic images.

Specifically, a signal synchronized with an image output onto the display surface of the plasma display device 100 is transmitted from a synchronization signal transmitter 110 of the stereoscopic image display device 200, and this signal is received by a synchronization signal receiver 130 of the image viewing glasses 210. The image viewing glasses 210 allow the lights that enter the left and right eyes to be subjected to a predetermined optical treatment based on the synchronized signal. This makes it possible for a viewer wearing the image viewing glasses 210 to view images displayed by the stereoscopic image display device 200, as stereoscopic images.

When the image viewing glasses 210 are provided with a liquid crystal shutter, an infrared emitter can be used for the synchronization signal transmitter 110 of the stereoscopic image display device 200 and an infrared sensor can be used for the synchronization signal receiver 130 of the image viewing glasses 210.

That is, the stereoscopic image display device 200 according to this embodiment is configured in a combination of the aforementioned plasma display device 100 and the image viewing glasses 210 with a liquid crystal shutter that is switched at a frequency of 120 Hz.

Therefore, it is necessary to prevent crosstalk, which is a phenomenon in which an image is viewed double, from occurring even when the liquid crystal shutter is switched at a frequency of 120 Hz. In order to achieve this, it is necessary that light emitted from each color phosphor of the PDP 10 has a persistence time of 3.5 msec or less. This makes an eye-friendly stereoscopic image display possible and further, more powerful stereoscopic images can be viewed.

3. Overview of Phosphors

As described above, the plasma display device 100 according to this embodiment is a plasma display device 100 that allows light emitted from green phosphors to have a short persistence time so as to be applicable as the stereoscopic image display device 200. Such a short persistence time was achieved with the following phosphors.

The green phosphor is a mixed phosphor containing a short persistence $Mn^{2+}$-activated green phosphor with a 1/10 persistence time of more than 2 msec but less than 5 msec and a $Ce^{3+}$-activated green phosphor having a light emission peak in a wavelength range of not less than 490 nm and less than 560 nm or an $Eu^{2+}$-activated green phosphor having a light emission peak in a wavelength range of not less than 490 nm and less than 560 nm.

Conventionally, a $Mn^{2+}$-activated green phosphor such as a ZSM phosphor has been used for a PDP, but the conventional $Mn^{2+}$-activated green phosphor had a long persistence time, specifically, at least 7 msec. It is known that the persistence time of the $Mn^{2+}$-activated green phosphor is shortened with an increase in the amount of Mn activator. However, the $Mn^{2+}$-activated green phosphor with the shortened persistence time has been considered to be not suitable for practical use due to its low luminance and luminance degradation resistance.

On the other hand, it is known that the $Ce^{3+}$-activated green phosphor and the $Eu^{2+}$-activated green phosphor each are a phosphor with a persistence time of less than 2 msec. However, the $Ce^{3+}$-activated green phosphor and the $Eu^{2+}$-activated green phosphor each have a disadvantage of a poor color purity.

The present inventors found through detailed research that a decrease in luminance of a short persistence $Mn^{2+}$-activated green phosphor with a persistence time of more than 2 msec can be compensated by using it in combination with a $Ce^{3+}$-activated green phosphor or an $Eu^{2+}$-activated green phosphor; the use of a combination of a short persistence $Mn^{2+}$-activated green phosphor and a $Ce^{3+}$-activated green phosphor or an $Eu^{2+}$-activated green phosphor allows a higher luminance maintenance rate than expected to be maintained; and a short persistence $Mn^{2+}$-activated green phosphor with a persistence time of less than 5 msec allows a persistence time of 3.5 msec or less to be achieved without impairing color purity considerably even when being used in combination with a $Ce^{3+}$-activated green phosphor or an $Eu^{2+}$-activated green phosphor.

In this specification, in order to distinguish from conventional phosphors, phosphors whose persistence time is more than 2 msec but less than 5 msec are referred to as short persistence phosphors. Furthermore, phosphors with a persistence time of less than 2 msec are referred to as ultra-short persistence phosphors.

Hereinafter, green phosphors and the properties thereof are described in detail. Furthermore, red phosphors and blue phosphors that are suitable for the use in this embodiment as well as the properties thereof also are described.

4. Composition of Green Phosphor

First, the composition of a green phosphor is described. The green phosphor used in this embodiment is a mixed phosphor containing a short persistence $Mn^{2+}$-activated green phosphor with a 1/10 persistence time of more than 2 msec but less than 5 msec and either a $Ce^{3+}$-activated green phosphor or an $Eu^{2+}$-activated green phosphor that has a light emission peak in a wavelength range of not less than 490 nm and less than 560 nm. It is based on the following experimental fact that such a phosphor achieves a short persistence time while exhibiting excellent luminance, luminance degradation resistance, and color purity.

Figure 5:
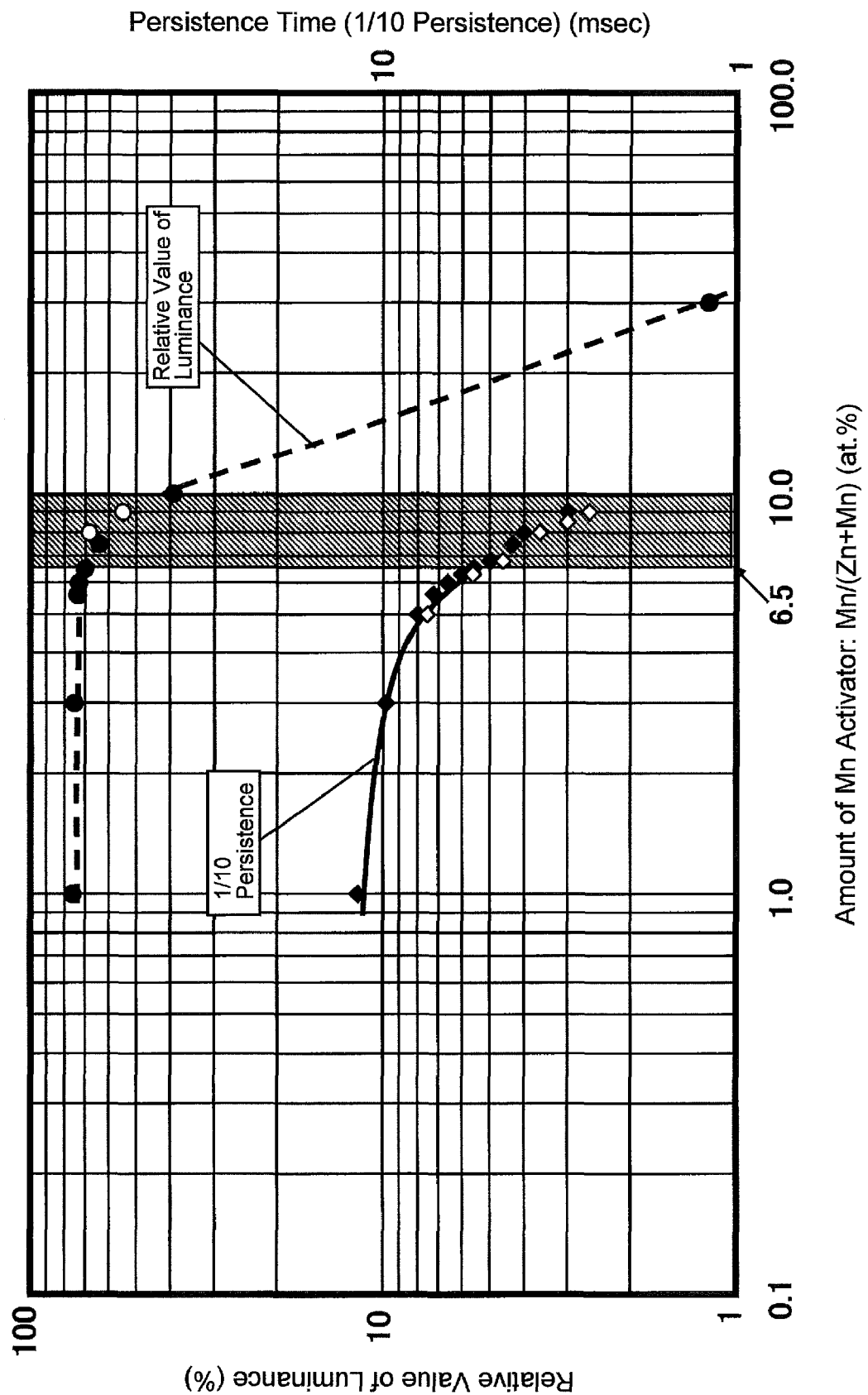
FIG. 5 is a diagram showing the relationship between luminance and persistence time with respect to the amount of Mn activator in a ZSM phosphor.

FIG. 5 is a diagram showing the relationship between luminance and persistence time with respect to the amount of Mn activator in a ZSM phosphor. In this case, the amount of Mn activator is a value indicating a ratio (Mn/(Zn+Mn)), in terms of at. %, at which Zn atoms of the ZSM phosphor were substituted by Mn atoms. Furthermore, in FIG. 5, the results indicated with symbols (circle and rhombus) in black are evaluation results obtained under a condition where a ZSM phosphor powder was excited with vacuum ultraviolet light (147 nm), while the symbols (circle and rhombus) in white indicate evaluation results obtained with the PDP 10. The results shown in FIG. 5 show that there is no considerable difference between the results of the phosphor powder and the evaluation results obtained with the PDP 10.

As shown in FIG. 5, the persistence time and luminance decrease with an increase in the amount of Mn activator. The persistence time decreases rapidly when the amount of Mn activator exceeds 4 at. % and the luminance decreases rapidly when the amount of Mn activator exceeds 6.5 at. %. Furthermore, in the region of a large amount of Mn activator where the amount of Mn activator exceeds 10 at. %, the luminance decreases excessively. This makes it impossible to evaluate the persistence time.

FIG. 5 shows that controlling the amount of Mn activator to be at least 6.5 at. % but less than 10 at. % allows the persistence time to be controlled to be at least 2 msec but less than 5 msec. Accordingly, in this embodiment, a ZSM phosphor with the amount of Mn activator controlled to be at least 6.5 at. % but less than 10 at. % in this manner can be used as a short persistence $Mn^{2+}$-activated green phosphor. In the short persistence ZSM phosphor, when the amount of Mn activator is 10 at. % or more, the luminance decreases considerably. Therefore, the amount of Mn activator is further desirably at least 7 at. % but not more than 9 at. %.

Moreover, in this embodiment, attention was brought to a YAG phosphor that was a $Ce^{3+}$-activated yttrium aluminum garnet phosphor with a persistence time of 1 msec or less, and the light emission properties of the YAG phosphor under vacuum ultraviolet excitation and light emission properties thereof in terms of the PDP 10 were examined. As a result, it was found that the YAG phosphor had a higher luminance when used for the PDP 10 as compared to the values anticipated based on the results reported in literatures and the evaluation result of the phosphor powder alone, and further the YAG phosphor had very high stability with respect to lighting time of the PDP 10.

Figure 6:
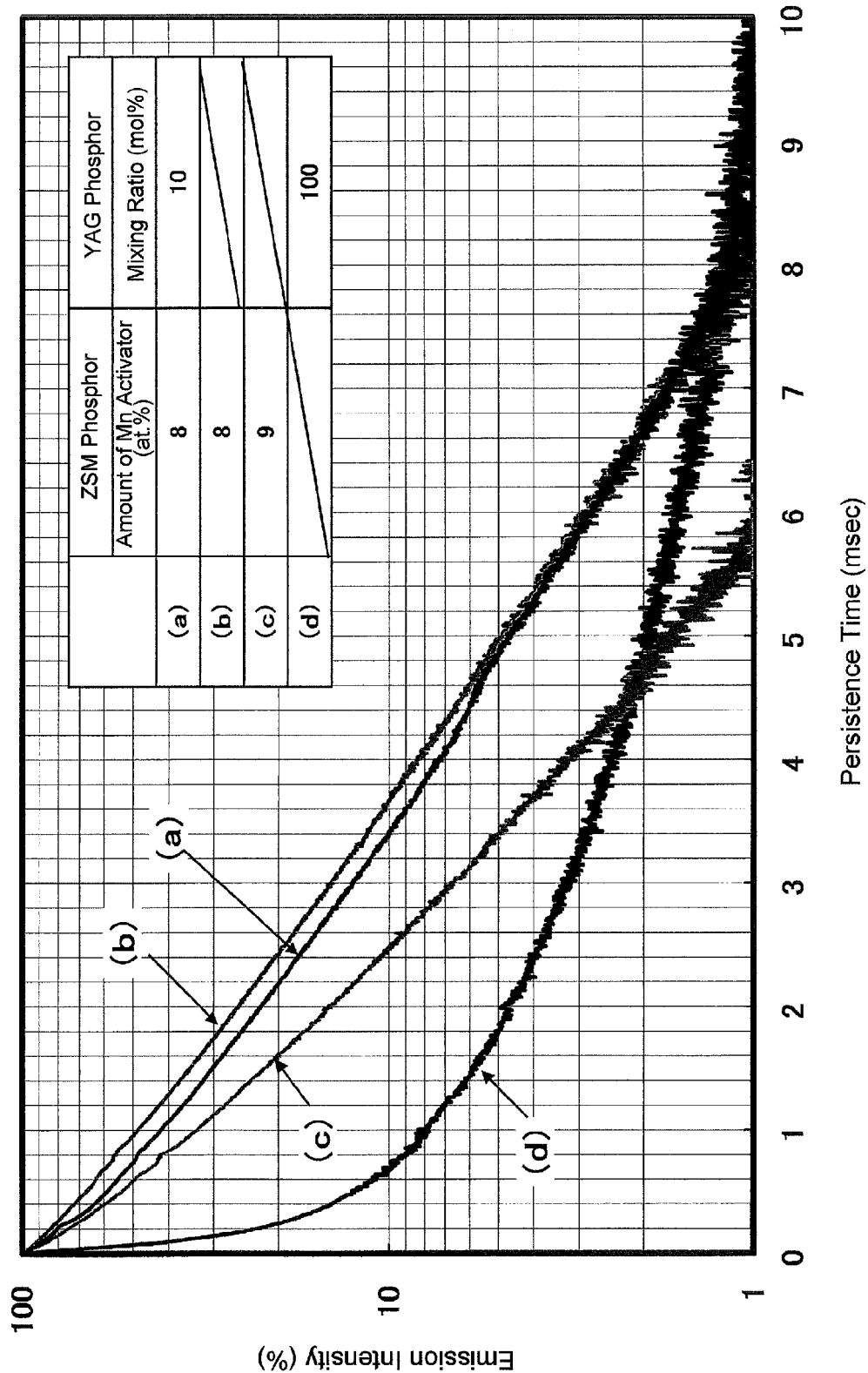
FIG. 6 is a diagram showing persistence properties in a green lighting cell of each of plasma display devices in which green phosphors to be studied were used.
Figure 7:
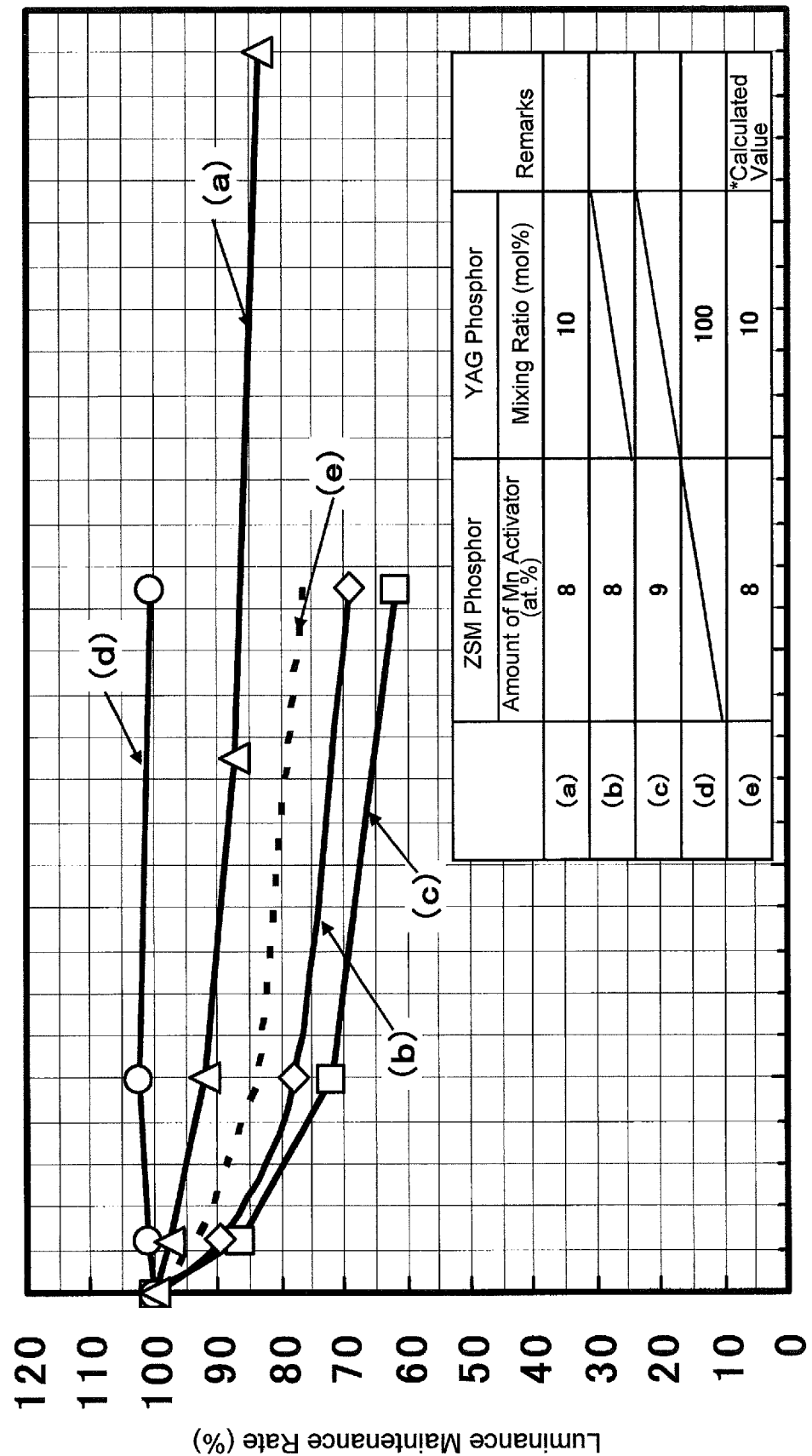
FIG. 7 is a diagram showing the change in luminance maintenance rate of the green lighting cell.

FIG. 6 is a diagram showing persistence properties in a green lighting cell of the plasma display device 100. Furthermore, FIG. 7 is a diagram showing the change in luminance maintenance rate with respect to lighting time of the green lighting cell in the case where a PDP 10 for a 42 inch full HD television set was used for the plasma display device 100. Specifically, FIG. 7 shows the cases where ZSM phosphors with varied amounts of Mn activator were used, a phosphor containing a YAG phosphor mixed with a ZSM phosphor was used, and further a YAG phosphor was used, for green phosphors. Moreover, with respect to the case where a phosphor containing a YAG phosphor mixed with a ZSM phosphor was used, FIG. 7 also indicates, as a reference, predicted values calculated based on the evaluation results of the change in panel luminance with the passage of time when each of the phosphors was evaluated using it alone for a panel.

In FIGS. 6 and 7, (a) indicates a phosphor containing a ZSM phosphor mixed with 10 mol % of YAG phosphor (the ratio in the mixed phosphor: 23 wt %), with the amount of Mn activator in the ZSM phosphor being set at 8 at. %, (b) indicates a ZSM phosphor alone in which the amount of Mn activator was 8 at. %, (c) indicates a ZSM phosphor alone in which the amount of Mn activator was 9 at. %, and (d) indicates a YAG phosphor alone. Among these phosphors, (a) is a green phosphor of the plasma display device 100 in this embodiment.

As shown in FIG. 6, those phosphors each had the following persistence time: (a) 3.4 msec, (b) 3.7 msec, (c) 2.4 msec, and (d) 0.7 msec. This shows that the persistence time can be shortened by mixing the YAG phosphor or increasing the amount of Mn activator. Furthermore, as shown with (d) in FIG. 6, the YAG phosphor with ultra-short persistence properties is an ultra-short persistence phosphor in which emission light is extinguished instantaneously when the vacuum ultraviolet light that serves as an excitation source is turned off.

As shown in FIG. 5, in the conventional ZSM phosphor with a high regard for luminance, the amount of Mn activator is less than 6 at. % and as a result, the persistence time is at least 7 msec. However, in this embodiment, 10 mol % of YAG phosphor was mixed with a short persistence $Mn^{2+}$-activated green phosphor in which the amount of Mn activator was 8 at. % and the persistence time was 3.7 msec, and thereby a persistence time of 3.5 msec or less that is practicable for a stereoscopic image display device 200 was obtained.

It is easy to obtain a short persistence time of 3.0 msec or less by increasing the amount of Mn activator in the ZSM phosphor or increasing the mixing ratio of the YAG phosphor.

On the other hand, in the case where these phosphors are used, the luminance maintenance rate of a green lighting cell to lighting time varies as shown in FIG. 7. That is, as in the cases of (b) and (c), when the amount of Mn activator in the ZSM phosphor alone is increased from 8% to 9% to shorten the persistence time, luminance degradation with respect to lighting time increases further. Such a phenomenon is seen commonly in short persistence $Mn^{2+}$-activated phosphors with increased amounts of $Mn^{2+}$ activator. Accordingly, it is not practical to shorten the persistence time by merely increasing the amount of Mn activator in the ZSM phosphor.

Furthermore, as shown with (d) in FIG. 7, it is found that the YAG phosphor alone had excellent properties in luminance maintenance rate. However, as described later, the YAG phosphor has an inferior color purity of emission light as compared to the $Mn^{2+}$-activated green phosphor. Therefore, the YAG phosphor alone cannot be used for the plasma display device 100.

Figure 8:
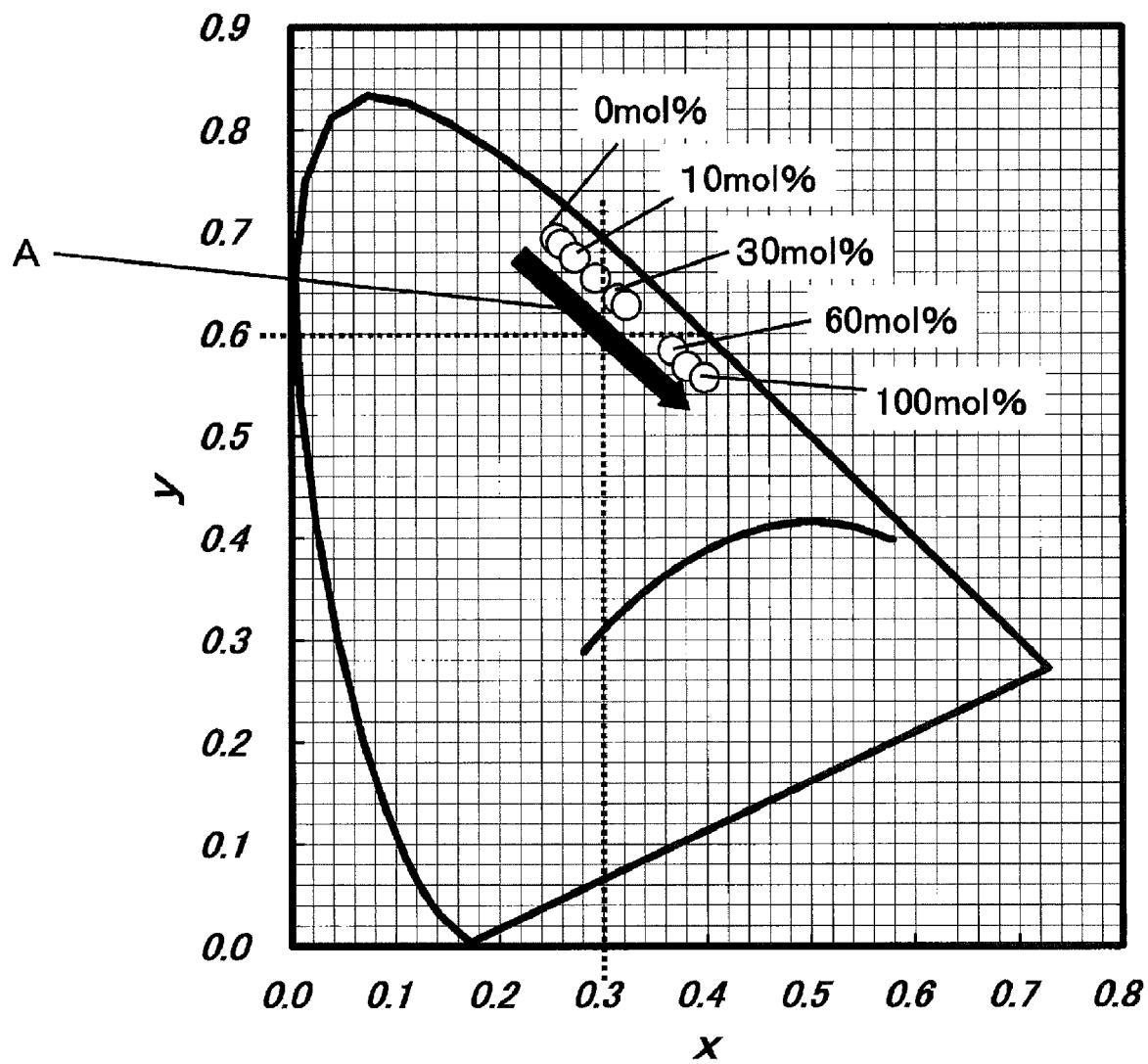
FIG. 8 is a diagram showing the CIE chromaticity coordinates, in terms of powder, of green phosphors, each of which contains a YAG phosphor mixed with a ZSM phosphor in which the amount of Mn activator is 8 at. %.
Figure 9:
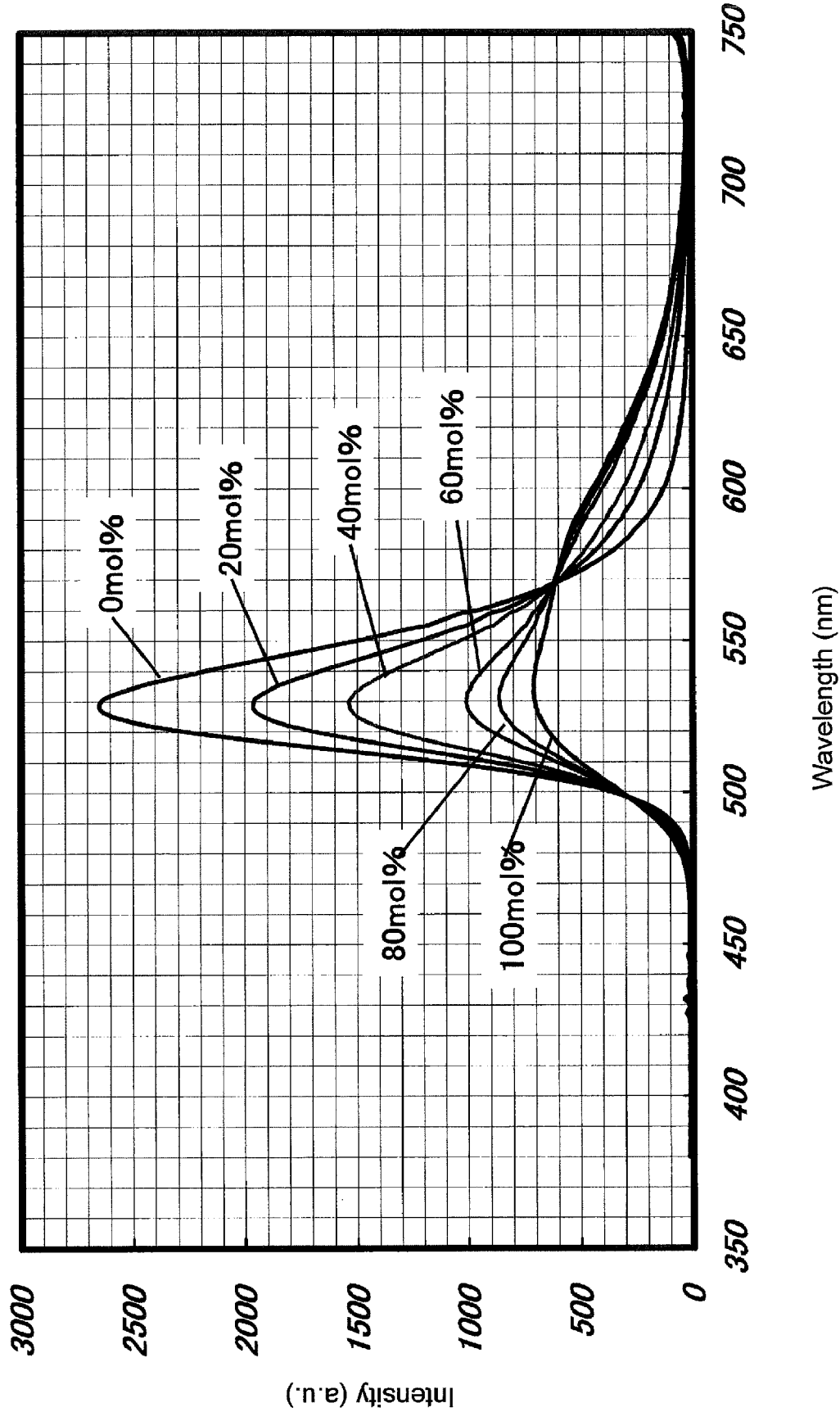
FIG. 9 is a diagram showing the relationship between the emission spectrum and the mixing ratio, in terms of powder, in each of the green phosphors.

Moreover, as shown in FIGS. 8 and 9, a high mixing ratio of the YAG phosphor results in a plasma display device with inferior color image quality.

On the other hand, the green phosphor (a) of this embodiment that contained 10 mol % of YAG phosphor mixed with a ZSM phosphor in which the amount of Mn activator was 8 at. % undergoes less change in luminance maintenance rate with respect to panel lighting time as compared to (b) and (c) in which simply the amount of Mn activator was increased. This result shows that (a) has a sufficiently high quality to be used for the plasma display device 100 and furthermore the result of (a) exceeds the predicted values calculated from the results of panel evaluation of each phosphor alone shown in (e).

That is, the green phosphor (a) that contains a predetermined amount of YAG phosphor mixed with a ZSM phosphor with a predetermined amount of Mn activator makes it possible to achieve a high luminance for a longer period of time while having a short persistence time.

With respect to the initial luminance of those phosphors in lighting the panel, when the initial luminance of the phosphor (b) whose persistence time is 3.7 msec is considered as 1, that of (c) is 0.79 and that of (d) is 1.15 while that of (a) of this embodiment is 1.06. Thus, the green phosphor (a) can achieve a high luminance.

The reason why the result of the green phosphor (a) of this embodiment is different from the predicted value of (e) can be considered as follows. The change in luminance with the passage of time is caused by Mn of the ZSM phosphor. However, it is considered that mixing with the YAG phosphor results in a distribution in which YAG phosphor is distributed more in the uppermost surface layer portion of the green phosphor layer and thereby the YAG phosphor prevents the ZSM phosphor from being deteriorated by ion bombardment.

Figure 10:
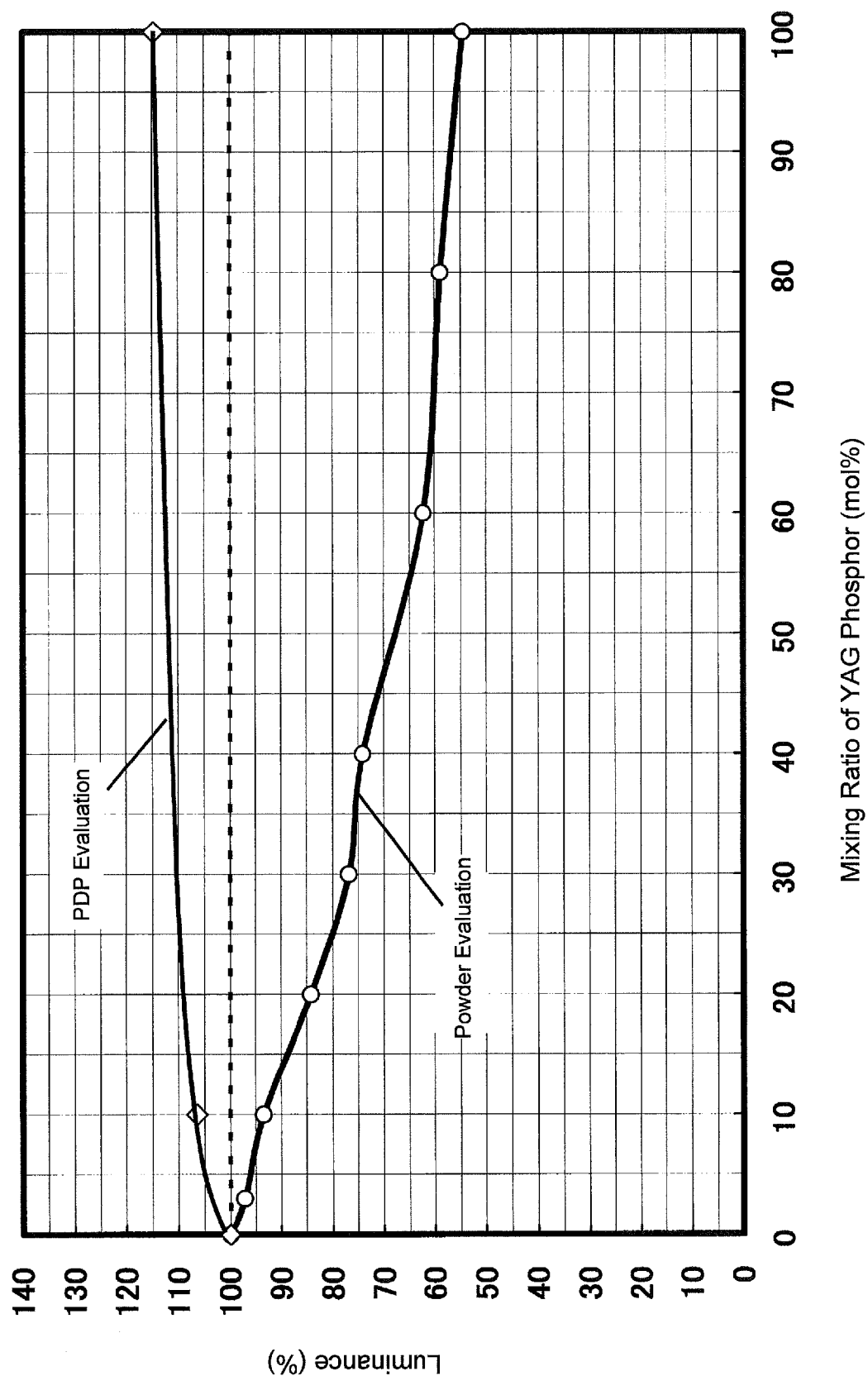
FIG. 10 is a diagram showing the relationships between luminance and the mixing ratios, in terms of PDPs and powder, in the green phosphors.
Figure 11:
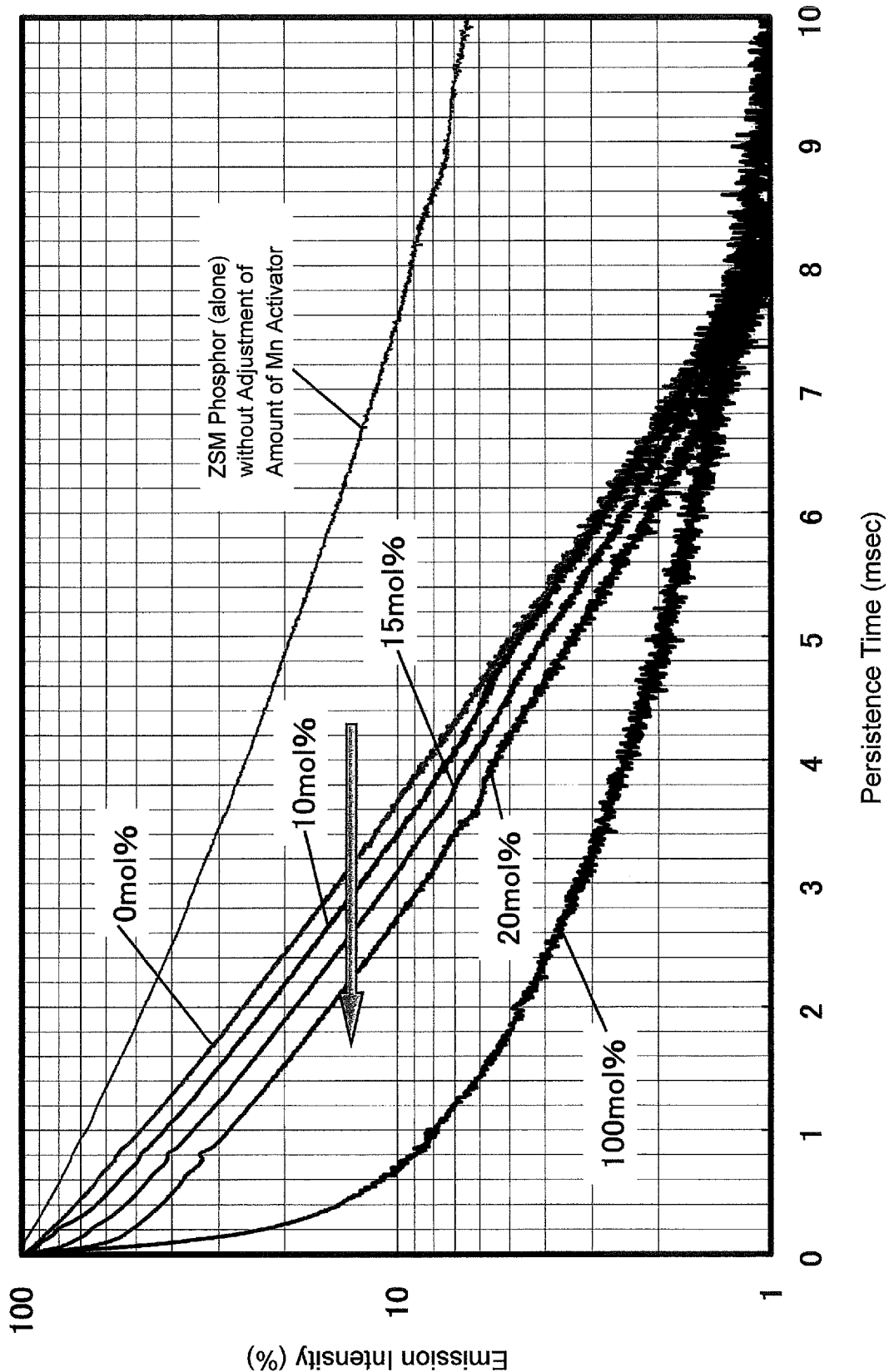
FIG. 11 is a diagram showing the relationships between persistence time and the mixing ratios, in terms of PDPs including the green phosphors used therein.

Next, the mixing ratio of the short persistence ZSM phosphor and the YAG phosphor is described. FIG. 8 shows the CIE chromaticity coordinates, in terms of powder, of green phosphors containing YAG phosphors mixed at various rates with short persistence ZSM phosphors in which the amount of Mn activator was 8 at. %. Furthermore, FIG. 9 shows the relationship between the emission spectrum and the mixing ratio in terms of powder. FIG. 10 shows the relationships between luminance and the mixing ratios in the case of the powder and in the case where it was used for the PDP 10. Moreover, FIG. 11 shows the persistence time with respect to the mixing ratios in the PDP 10.

In FIG. 8, the x-y coordinates are plotted that were obtained in the cases where the mixing ratios of the YAG phosphors in the mixed phosphors were 0 mol %, 3 mol %, 10 mol %, 20 mol %, 30 mol %, 40 mol %, 60 mol %, 80 mol %, and 100 mol %. FIG. 8 shows that as the mixing ratio of the YAG phosphor increases, the x-y coordinates shift in the direction indicated with the arrow A in FIG. 8 and the color tone of green light changes gradually to a yellow-greenish tone. For the green color purity, the x value is required to be 0.3 or lower and the y value is required to be at least 0.6. Particularly, in order to obtain a y value of at least 0.6, the mixing ratio of the YAG phosphor is desirably 40 mol % or less.

For the purpose of a reference, FIG. 9 shows the spectral distribution of green light emitted from each mixed green phosphor of the ZSM phosphor and the YAG phosphor.

As shown in FIG. 9, the short persistence ZSM phosphor has a sharp light emission peak in a wavelength range of not less than 500 nm and less than 560 nm. An increase in mixing ratio of the YAG phosphor causes a gradual decrease in peak intensity around 530 nm of light emitted by short persistence ZSM phosphors and the emission spectrum half width increases with the addition of a component of yellow-green light of the YAG phosphors.

As shown in FIG. 9, the YAG phosphor alone exhibits green light with a wide emission spectrum half width having its light emission peak in a wavelength range of not less than 490 nm and less than 560 nm. In this embodiment, a $Ce^{3+}$-activated green phosphor or an $Eu^{2+}$-activated green phosphor is mixed with a short persistence $Mn^{2+}$-activated green phosphor. These phosphors have a wider emission spectrum half width than that of the $Mn^{2+}$-activated green phosphor and are inferior to the $Mn^{2+}$-activated green phosphor in terms of the color purity, but they have ultra-short persistence.

Furthermore, FIG. 10 shows the results of luminance measured in terms of powder and the PDP 10 with respect to the mixing ratio of the YAG phosphor when the YAG phosphor was mixed with a short persistence ZSM phosphor in which the amount of Mn activator was 8 at. %.

As shown in FIG. 10, the luminance of the powder decreases with an increase in the mixing ratio of the YAG phosphor. However, in the luminance evaluation of the PDP 10, contrary to expectation based on the luminance evaluation of the powder, an improvement in luminance with an increase in the mixing ratio of the YAG phosphor is observed.

The reason for this can be considered as follows. Generally, the evaluation in terms of powder is carried out under a condition of continuous lighting of vacuum ultraviolet light, while the evaluation in terms of PDP 10 is carried out under a condition where it is lighted at a high frequency pulse and is irradiated with vacuum ultraviolet light. Accordingly, phosphors with a shorter persistence time predominate in terms of luminance and therefore it is considered that ultra-short persistence phosphors have an advantage in terms of luminance. Furthermore, while the evaluation in terms of powder is carried out under vacuum ultraviolet excitation at 147 nm using an excimer light source, the evaluation in terms of the PDP 10 is carried out under light excitation caused by a neon (Ne)-xenon (Xe) discharge containing vacuum ultraviolet light. Therefore, it can be considered that, for example, excitation light components other than those of 147 nm worked advantageously to the YAG phosphors.

It also can be considered that the difference in degree of property degradation during panel production worked so as to relatively improve the luminance of the YAG phosphors.

Similarly, FIG. 11 shows the persistence properties in green pixels with respect to mixing ratios of the YAG phosphor. The mixing ratios of the YAG phosphor in mixed phosphors are 0 mol %, 10 mol % (23 wt %), 15 mol % (32 wt %), 20 mol % (40 wt %), and 100 mol %, respectively. FIG. 11 shows that as the mixing ratio of the YAG phosphor increases, persistence time is shortened from 3.6 msec to 3.4 msec, 3.1 msec, 2.7 msec, and less than 1 msec as indicated with the arrow in FIG. 11.

For the purpose of a reference, FIG. 11 also shows the persistence properties of a conventional general $Mn^{2+}$-activated green phosphor in which the amount of Mn activator is not adjusted, specifically, the amount of Mn activator is not increased. As is apparent from FIG. 11, such a conventional green phosphor has a longer persistence time, specifically, 7 msec to 8 msec, and therefore cannot be used alone as a phosphor for a PDP that can display stereoscopic images.

Moreover, in the case where a conventional general $Mn^{2+}$-activated green phosphor is used, in order to achieve a shorter persistence time, specifically, 3.5 msec or less, it is necessary to increase the mixing ratio of an ultra-short persistence phosphor with an inferior color purity.

Tables 1 and 2 show those results together.

Table 1 shows examples of conventional art. That is, Table 1 shows results of the green phosphors, each of which contains a YAG phosphor mixed with a ZSM phosphor with a ¹⁄₁₀ persistence time of approximately 8 msec, and evaluation results of green color tone, persistence time, and PDP luminance with respect to the mixing ratio of the YAG phosphor. In this case, the color tone is indicated in terms of whether the y value of the color coordinate is at least 0.6, the persistence time is indicated in terms of whether it is less than 3.5 msec, and the luminance is indicated in terms of the results obtained through comparison with the evaluation result of the ZSM phosphor alone.

TABLE 1

| | Mixing Ratio of YAG Phosphor (mol %) | | | | | | | | | | | | | |
|---|---|---|---|---|---|---|---|---|---|---|---|---|---|---|
| | 0 | 3 | 8 | 10 | 15 | 20 | 30 | 40 | 50 | 60 | 70 | 80 | 90 | 100 |
| Green Color Tone (y > 0.6) | ◉ | | | | | | (Δ) | (Δ) | (X) | X | | | | X |
| Persistence Time (<3.5 msec) | X | | | | | | (X) | (X) | (◉) | ◉ | | | | ◉ |
| PDP Luminance | ◉ | | | | | | (○) | (○) | (○) | (○) | | | | ○ |
| Lifetime | — | | | | | | (—) | (—) | (—) | (—) | | | | — |
| Comprehensive Evaluation | X | X | X | X | X | X | Δ | Δ | Δ | Δ | X | X | X | X |

In Table 1, ◉ indicates "excellent", ○ "good", Δ "acceptable", and X "not acceptable".

From the results shown in Table 1, in the case where a YAG phosphor is mixed with an ordinary ZSM phosphor, when the mixing ratio of the YAG phosphor is 40 mol % or less, there is no range that satisfies the short persistence properties in the first place. Furthermore, when the mixing ratio of the YAG phosphor exceeds 40 mol %, the short persistence properties can be satisfied but the green color tone is inferior. Accordingly, there is no range that satisfies both the short persistence properties and the green color tone perfectly.

On the other hand, Table 2 shows the results of green phosphors in the above-mentioned embodiment. That is, Table 2 shows the results, each of which was obtained when a YAG phosphor was mixed with a short persistence ZSM phosphor with a ¹⁄₁₀ persistence time of 3.7 msec (the amount of Mn activator was 8.0 at. %), and evaluation results of green color tone, persistence time, and PDP luminance with respect to the mixing ratio of the YAG phosphor. Furthermore, the color tone is indicated in terms of whether the y value of the color coordinate is at least 0.6, the persistence time is indicated in terms of whether it is less than 3.5 msec, and the luminance is indicated in terms of the results obtained through comparison with the evaluation result of the ZSM phosphor alone.

TABLE 2

| | Mixing Ratio of YAG Phosphor (mol %) | | | | | | | | | | | | | |
|---|---|---|---|---|---|---|---|---|---|---|---|---|---|---|
| | 0 | 3 | 8 | 10 | 15 | 20 | 30 | 40 | 50 | 60 | 70 | 80 | 90 | 100 |
| Green Color Tone (y > 0.6) | ◉ | ◉ | | ◉ | | Δ | Δ | Δ | | X | | X | | X |
| Persistence Time (<3.5 msec) | X | O | | O | O | ◉ | | | | | | | | ◉ |
| PDP Luminance | Δ | | | O | | | | | | | | | | O |
| Lifetime | X | | | O | | | | | | | | | | ◉ |
| Comprehensive Evaluation | X | O | ◉ | ◉ | ◉ | O | O | O | X | X | X | X | X | X |

In Table 2, ◉ indicates "excellent", O "good", Δ "acceptable", and X "not acceptable".

From the above results, when a YAG phosphor, specifically a $Ce^{3+}$-activated yttrium aluminum garnet phosphor, is added to a short persistence ZSM phosphor in an amount of at least 3 mol % but not more than 40 mol %, desirably at least 8 mol % but not more than 15 mol %, overall properties of the luminance, color tone, short persistence time, and luminance maintenance rate that indicates lifetime are satisfied.

That is, the green color tone shifts when the mixing ratio of the YAG phosphor exceeds 40 mol %, while the persistence properties cannot be satisfied when the mixing ratio is less than 3 mol %. Furthermore, the luminance and lifetime also cannot be satisfied when it is less than 3 mol %. When the mixing ratio is at least 8 mol % but not more than 15 mol %, green phosphors can be obtained that can satisfy the luminance, chromaticity, and persistence properties further.

The above description indicates that according to a technical thought that the ZSM phosphor having an excellent color purity but a longer persistence time is allowed to have a shorter persistence time and this is mixed with the YAG phosphor having a poor color purity but ultra-short persistence, an excellent color purity and a persistence time of less than 3.5 msec can be achieved and further excellent luminance and luminance degradation resistance can be obtained.

Such a technical thought can be applied to short persistence $Mn^{2+}$-activated green phosphors in general due to the similar material properties thereof. With respect to the degree of green of emission light of the short persistence $Mn^{2+}$-activated green phosphors, it is desirable that the short persistence $Mn^{2+}$-activated green phosphors each have a light emission peak in a wavelength range of not less than 500 nm and less than 560 nm, preferably not less than 510 nm and less than 540 nm.

In the above description, mainly the $Ce^{3+}$-activated yttrium aluminum garnet phosphor was explained as one example of green phosphors. However, when consideration is given to the fact that a Mn ion can have many valences such as divalent, trivalent, tetravalent, and heptavalent, $Ce^{3+}$ and $Eu^{2+}$ that function as light emission centers are more stable than $Mn^{2+}$ in terms of ease of ion valence change. Therefore, when at least one of the $Ce^{3+}$-activated green phosphor having a light emission peak in a wavelength range of not less than 490 nm and less than 560 nm other than the $Ce^{3+}$-activated yttrium aluminum garnet phosphor and the $Eu^{2+}$-activated green phosphor having a light emission peak in a wavelength range of not less than 490 nm and less than 560 nm is mixed, similar function effects can be obtained on one level or another due to similar material properties thereof.

Since particularly the $Eu^{2+}$-activated green phosphor has a narrower half width of emission spectrum as compared to the $Ce^{3+}$-activated green phosphor and can emit green light with a relatively good color purity, the color tone of green light emitted by green pixels can be improved.

Furthermore, the use of the $Eu^{2+}$-activated green phosphor makes it possible to relatively reduce the ratio of the short persistence $Mn^{2+}$-activated green phosphor to be used that is inferior in terms of the luminance and luminance degradation resistance, as compared to the case where the $Ce^{3+}$-activated green phosphor is used. This allows a further shorter persistence time to be obtained. Moreover, it also is possible to increase the lifetime and luminance of the mixed green phosphor by allowing the short persistence ZSM to have relatively long persistence.

In this embodiment, besides $Mn^{2+}$-activated zinc silicate green phosphors such as $Zn_2SiO_4:Mn^{2+}$, for example, $MgAl_2O_4:Mn^{2+}$, $Li_2Zn(Ge, \theta)_zO_8:Mn^{2+}$ ($\theta$ is Al or Ga, and z is 3 to 4), $BaMgAl_{10}O_{17}:Mn^{2+}$, $BaAl_{12}O_{19}:Mn^{2+}$, and $Zn(Ga_{1-x}Al_x)_2O_4:Mn^{2+}$ (x is 0.2 to 0.8) can be used as the short persistence $Mn^{2+}$-activated green phosphor. The short persistence $Mn^{2+}$-activated green phosphor is desirably a $Mn^{2+}$-activated zinc silicate green phosphor. In the $Mn^{2+}$-activated zinc silicate green phosphor, it is desirable that the amount of Mn activator is at least 6.5 at. % but less than 10 at. %. Further desirably, the $Mn^{2+}$-activated zinc silicate green phosphor emits green light with a 1/10 persistence time of less than 4.0 msec.

Examples of the $Mn^{2+}$-activated zinc silicate green phosphor include a phosphor whose base material has been subjected to a remedial treatment, that is, a ZSM phosphor subjected to a surface coating treatment, and a ZSM phosphor in which the composition ratio of Zn or Si is allowed to shift slightly from that of a stoichiometric composition $(Zn,Mn)_2SiO_4$ and the half value of the total number of atoms of (Zn+Mn) is more than 0.5 but less than 2.0 with respect to one Si atom. Examples of the $Mn^{2+}$-activated zinc silicate green phosphor also include $(Zn,Mg)_2SiO_4:Mn^{2+}$, $Zn_2(Si,Ge)O_4:Mn^{2+}$, and a ZSM phosphor with impurities added thereto.

Furthermore, examples thereof also include a ZSM phosphor whose surface has been coated with a phosphorus compound. A short persistence $Mn^{2+}$-activated zinc silicate green phosphor whose surface has been coated acts so as to improve the stability of the phosphor by preventing, for example, ion bombardment.

In this embodiment, the above-mentioned $Ce^{3+}$-activated green phosphor is desirably a $Ce^{3+}$-activated yttrium aluminum garnet phosphor. Desirably, the $Ce^{3+}$-activated yttrium aluminum garnet phosphor is contained in the mixed phosphor in an amount of at least 3 mol % but not more than 40 mol %.

The $Ce^{3+}$-activated yttrium aluminum garnet phosphor indicates a phosphor that has been activated with $Ce^{3+}$ and contains at least yttrium, aluminum, and oxygen as major elements of the basic skeleton forming the phosphor crystal. Therefore, for example, $Y_3(Al,Ga)_5O_{12}:Ce^{3+}$ and $MgY_2SiAl_4O_{12}:Ce^{3+}$ also are included in the examples of the $Ce^{3+}$-activated yttrium aluminum garnet phosphor.

Besides the $Ce^{3+}$-activated yttrium aluminum garnet phosphors, for example, $Eu^{2+}$-activated oxonitridosilicate green phosphors (for example, $Ba_3Si_6O_{12}N_2:Eu^{2+}$ (known as BSON)), $Eu^{2+}$-activated oxonitridoaluminosilicate green phosphors (for example, $SrSiAl_2O_3N_2:Eu^{2+}$), $Eu^{2+}$-activated alkaline earth metal silicate halide green phosphors (for example, $Sr_4Si_3O_8Cl_4:Eu^{2+}$ (known as chlorosilicate), $Ca_8Mg(SiO_4)_4Cl_2:Eu^{2+}$, and $Ca_3SiO_4Cl_2:Eu^{2+}$), $Eu^{2+}$-activated alkaline earth metal silicate green phosphors (for example, $Ba_2MgSi_2O_7:Eu^{2+}$, $Ca_2MgSi_2O_7:Eu^{2+}$, and $BaSi_2O_5:Eu^{2+}$), $Eu^{2+}$-activated alkaline earth metal borophosphate green phosphors (for example, $Sr_6BP_5O_{20}:Eu^{2+}$), and $Eu^{2+}$-activated alkaline earth metal aluminate green phosphors (for example, $Ba_{0.82}Al_{12}O_{18.82}:Eu^{2+}$) can be used.

In this embodiment, the green phosphor further may include a $Tb^{3+}$-activated green phosphor such as a YAB phosphor having a light emission peak in the vicinity of 545 nm where the spectral luminous efficacy is high, within a range that does not impair the effects of the present invention. In this case, a further higher luminance can be obtained.

In this embodiment, for the purpose of obtaining green light with an excellent color purity, the x value and the y value of the green light in the CIE chromaticity diagram are preferably values that satisfy $0.24<x<0.35$ and $0.60<y<0.72$, respectively, while for the purpose of obtaining short persistence green light with a high luminance, the $1/10$ persistence time of green light is preferably at least 1 msec but not more than 3 msec.

The green phosphors of this embodiment are aggregates of phosphor particles with a primary particle size (diameter) of approximately 0.5 μm to 2 μm. It is desirable that they do not contain fine particles whose particle sizes are smaller than 0.1 μm (100 nm) or coarse particles whose particle sizes exceed 10 μm. Furthermore, it is more preferable that all the phosphors have an average particle size ($D_{50}$) of at least 1.5 μm but smaller than 4.0 μm, further at least 1.8 μm but smaller than 3.5 μm. That is, it is desirable to adjust the particle size so that the short persistence $Mn^{2+}$-activated green phosphor is not hindered from being mixed with the $Ce^{3+}$-activated green phosphor or $Eu^{2+}$-activated green phosphor by the existence of fine particles and coarse particles.

Such a phosphor shape allows the phosphor layer surface of the PDP 10 to be smoothened and the discharge space to be enlarged, and thereby the discharge efficiency improves. Furthermore, not only can a higher luminance be obtained through an increase in coverage of phosphor particles with respect to the barrier ribs 34 and the like, but also the discharge stability improves through inhibition of, for example, generation of impurity gas by densification of the phosphor layer.

5. Composition of Red Phosphor

In a plasma display device, phosphors other than the green phosphor also are required to have short persistence and to be excellent in luminance, luminance degradation resistance, and color tone. In this embodiment, as long as the persistence properties, luminance, luminance degradation resistance, and color tone are at suitable levels for stereoscopic image devices, the red phosphor to be used is not particularly limited. Preferably, the red phosphor used in this embodiment is an $Eu^{3+}$-activated red phosphor that emits red light having its main emission peak in a wavelength range of not less than 610 nm and less than 630 nm and in which the maximum intensity of an orange emission component with a wavelength range of not less than 580 nm and less than 600 nm is at least 2% but lower than 20% of the intensity of the main emission peak. In this case, "an $Eu^{3+}$-activated red phosphor that emits red light having its main emission peak in a wavelength range of not less than 610 nm and less than 630 nm" denotes a red phosphor in which $Eu^{3+}$ is contained as an activator and the light emission component with the highest emission intensity among the light emission components emitted from $Eu^{3+}$ is in a wavelength range of not less than 610 nm and less than 630 nm in the emission spectrum evaluation made in the state where it does not pass through the color filter of a PDP. Therefore, examples thereof do not include orange/red-or-ange phosphors having their main emission peaks in the vicinity of 593 nm like a YGB phosphor and $InBO_3:Eu^{3+}$ known as phosphors for electron tubes. It is based on the following experimental fact that the above-described phosphors are those with suitable properties for stereoscopic image devices.

Figure 12:
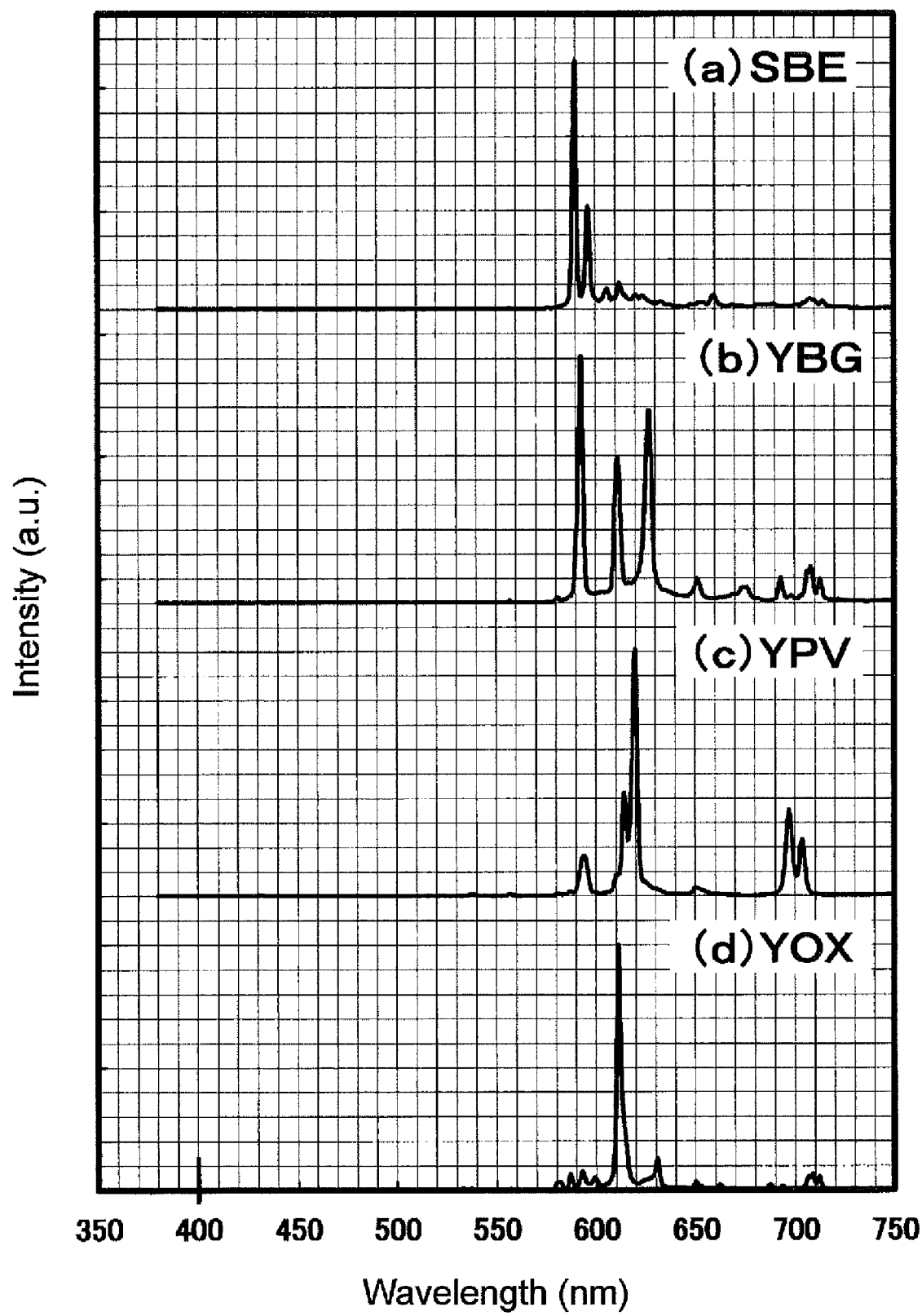
FIG. 12 is a diagram showing emission spectra of powders of $Eu^{3+}$-activated red phosphors whose emission colors are different from one another.
Figure 13:
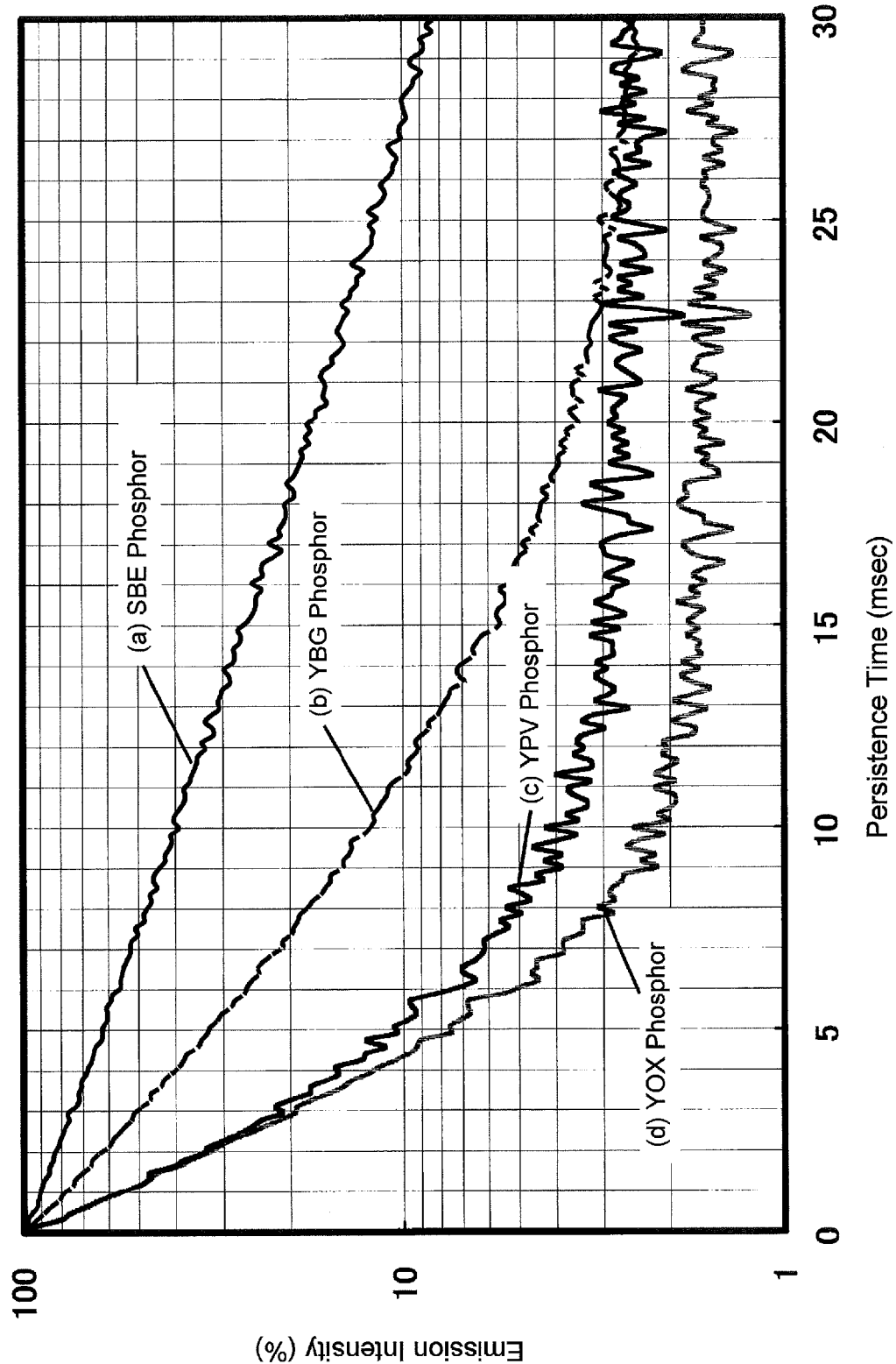
FIG. 13 is a diagram showing the persistence properties of the red phosphors in terms of powder.

FIG. 12 is a diagram showing emission spectra of $Eu^{3+}$-activated red phosphors whose emission colors are different from one another, and FIG. 13 is a diagram showing the persistence properties thereof. In FIGS. 12 and 13, as examples of the $Eu^{3+}$-activated red phosphor, (a) indicates $ScBO_3:Eu^{3+}$ (a SBE phosphor), (b) indicates a YGB phosphor, (c) indicates a YPV phosphor, and (d) indicates a YOX phosphor. Both FIGS. 12 and 13 indicate the properties in terms of powder.

As can be understood by a comparison between FIGS. 12 and 13, the persistence time of the $Eu^{3+}$-activated red phosphors has a correlation with the intensity ratio between the red emission component in a wavelength range of not less than 610 nm and less than 630 nm and the orange emission component in a wavelength range of not less than 580 nm and less than 600 nm, and those with higher ratios of the red emission component in a wavelength range of not less than 610 nm and less than 630 nm have shorter persistence times. In this case, the orange emission component is an emission component based on a magnetic dipole transition, and the red emission component is an emission component based on an electric dipole transition.

Accordingly, in this embodiment, an $Eu^{3+}$-activated red phosphor having a high emission rate based on the electric dipole transition of $Eu^{3+}$ ions is used as the red phosphor to shorten the persistence time. Among such phosphors, the YPV phosphor is that in which a decrease in ratio of P to the total amount of P and V in the YPV phosphor results in a decrease in ratio of the orange emission component based on the magnetic dipole transition and in an increase in ratio of the red emission component based on the electric dipole transition. Therefore, the YPV phosphor allows the persistence time to be shortened further.

Figure 14:
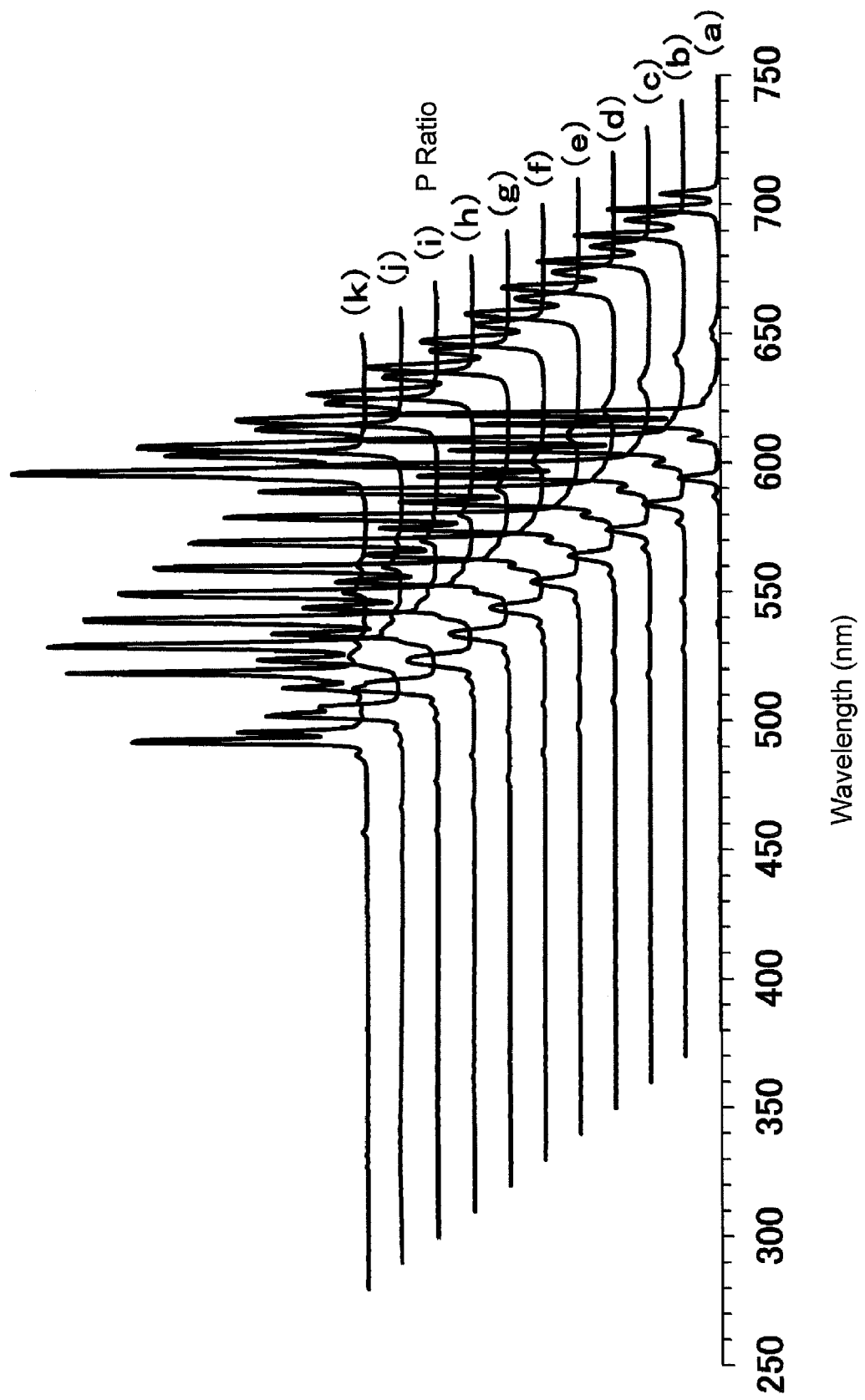
FIG. 14 is a diagram showing emission spectra, in terms of powder, of YPV phosphors with respective P ratios.
Figure 15:
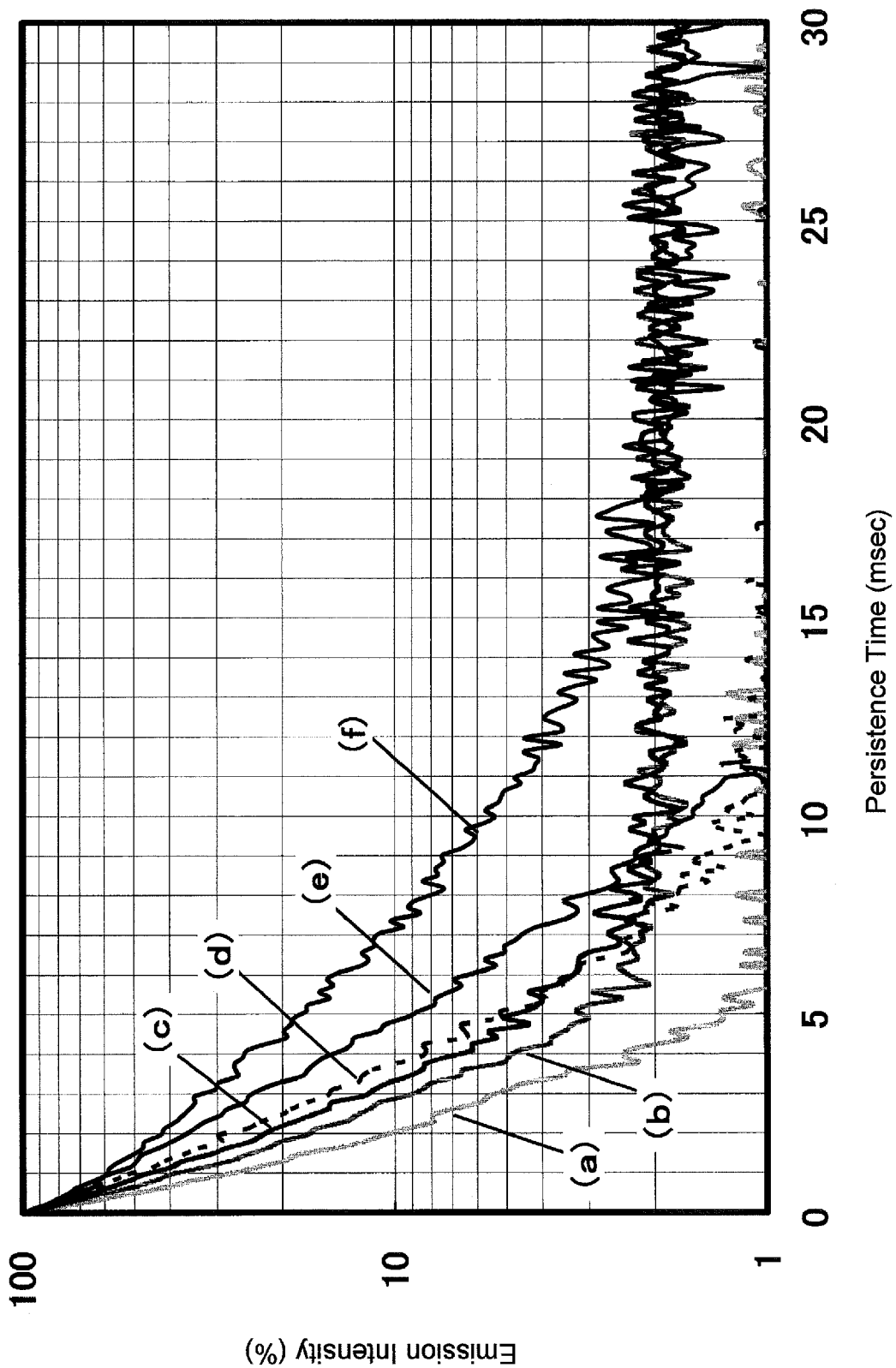
FIG. 15 is a diagram showing persistence properties of the YPV phosphors in terms of powder.

FIG. 14 is a diagram showing emission spectra with respect to the ratios of P to the total amount of P and V (P/(P+V); hereinafter referred to as a "P ratio") in the YPV phosphor. Similarly, FIG. 15 is a diagram showing the persistence properties thereof. Both of them show the results obtained in terms of powder. In FIG. 14, (a) to (k) indicate emission spectrum shapes of YPV phosphors obtained when the P ratios were 0, 10, 20, 30, 40, 50, 60, 70, 80, 90, and 100 at. %, respectively. The ratio (%) of the maximum intensity of the orange emission component in a wavelength range of not less than 580 nm and less than 600 nm to the intensity of the main emission peak located in a wavelength range of not less than 610 nm and less than 630 nm was as follows: (a) 11.8, (b) 11.8, (c) 12.4, (d) 13.1, (e) 13.9, (f) 15.4, (g) 17.0, (h) 18.6, (i) 24.0, (j) 38.4, and (k) 77.8. Furthermore, (a) to (f) in FIG. 15 indicate the persistence properties of the YPV phosphors obtained when the P ratios were 0, 20, 40, 60, 80, and 100 at. %, respectively.

Figure 16:
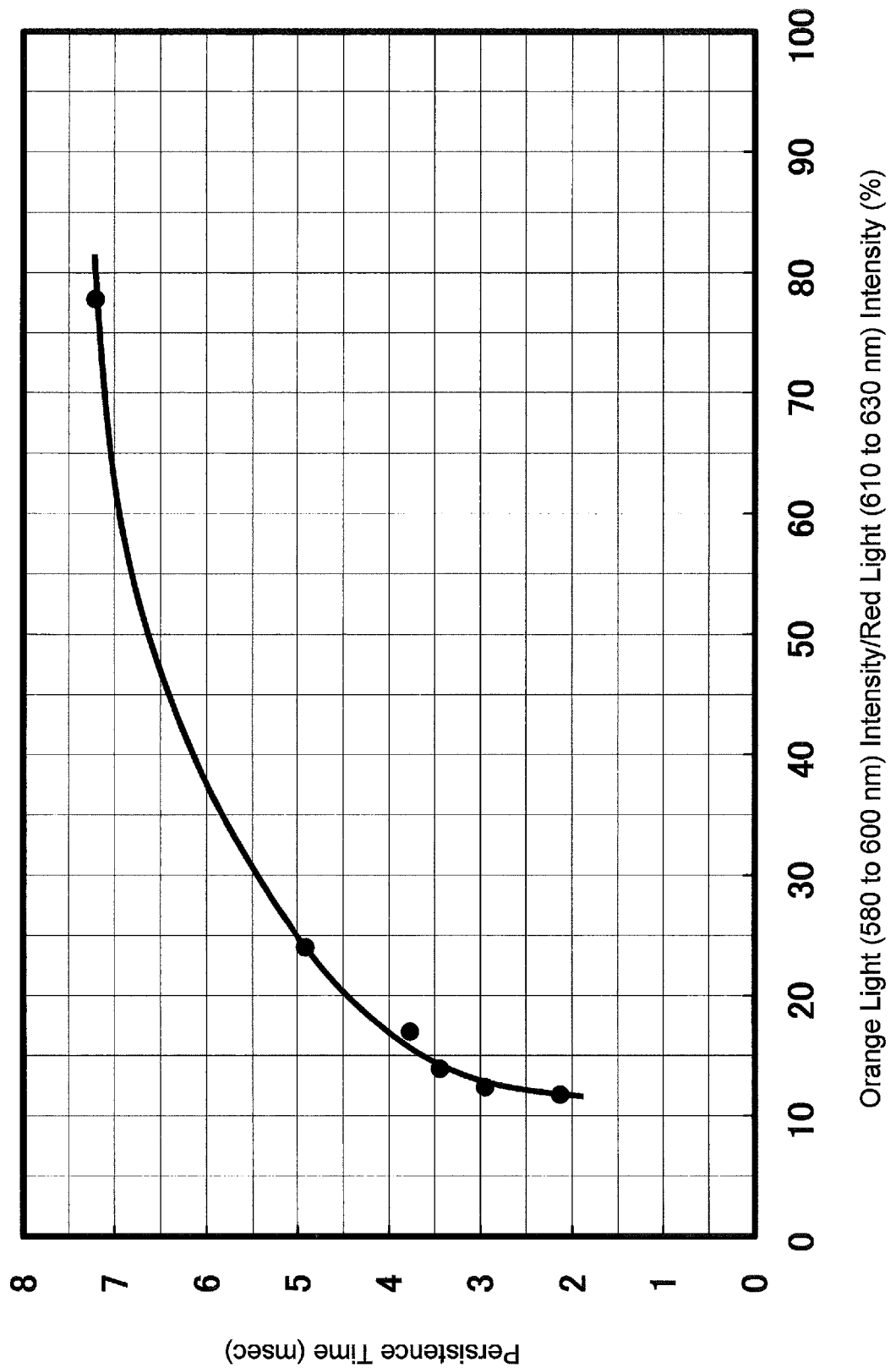
FIG. 16 is a diagram showing the relationship between persistence time and an intensity ratio of orange light to red light in each of the YPV phosphors in terms of powder.

FIG. 16 shows the results shown in FIGS. 14 and 15 together. FIG. 16 is a diagram showing the relationship between the persistence time and the ratio of maximum intensity of the orange emission component in a wavelength range of not less than 580 nm and less than 600 nm to the intensity of the main emission peak located in a wavelength range of not less than 610 nm and less than 630 nm in the YPV phosphors whose P ratios are different from one another. That is, FIG. 16 is a diagram showing the relationship between the persistence time and the intensity ratio of orange light to red light as main emission. FIG. 16 also shows the evaluation results in terms of powder.

Figure 17:
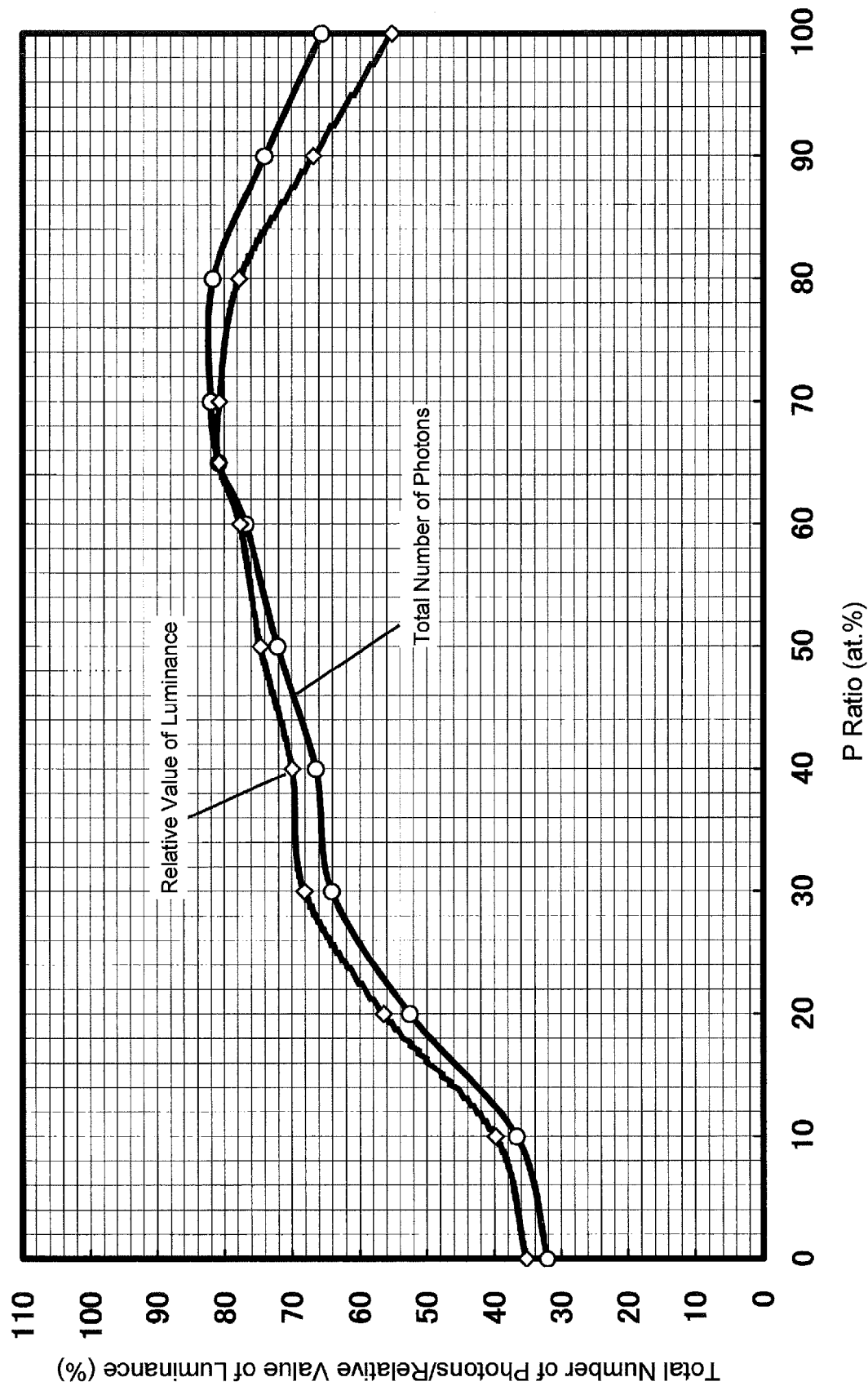
FIG. 17 is a diagram showing the relationship between the P ratio, and the total number of photons and the relative value of luminance that were evaluated under vacuum ultraviolet (147 nm) excitation, in terms of powder in each of the YPV phosphors.

Furthermore, FIG. 17 is a diagram showing the relationship between the total number of photons and the relative value of luminance that were evaluated under vacuum ultraviolet (147 nm) excitation with respect to the P ratio in terms of powder of each YPV phosphor.

From FIG. 16, in the evaluation of emission spectrum in the state where light does not pass through a color filter, a persistence time of at least 2.0 msec but less than 4.5 msec is obtained when the intensity ratio of orange light to red light is at least 10% but lower than 20%. Furthermore, a persistence time of at least 2.0 msec but not more than 3.5 msec is obtained when the intensity ratio is at least 10% but lower than 15%, and a persistence time of at least 2.0 msec but not more than 3.0 msec is obtained when the intensity ratio is at least 10% but lower than 12%. Accordingly, when consideration is given to, for example, experimental errors, a preferable intensity ratio in terms of a persistence time of 3.5 msec or less is at least 5% but lower than 20%, more preferably at least 5% but lower than 15% and at least 5% but lower than 12%.

In this case, a PDP can be provided with an optical filter that is designed optically to excessively absorb orange light components at least in the vicinity of a wavelength of 590 nm to 595 nm. Therefore, if a color filter in which the optical transmittance in a wavelength range of not less than 580 nm and less than 600 nm is set at a level of 40% to 50% of the optical transmittance in a wavelength range of not less than 610 nm and less than 630 nm is used in a PDP, a preferable intensity ratio of orange light to red light in terms of the persistence time can be the intensity ratio obtained after they have passed through the color filter, and that intensity ratio has a decreased lower limit and is at least 2% but lower than 20%, preferably at least 2% but lower than 15%, and more preferably at least 2% but lower than 12%. When the intensity ratio of orange light to red light is at this level, an excellent color purity also is obtained.

From, for example, the results obtained in terms of powder with different P ratios of the YPV phosphors shown in FIG. 15 and the evaluation of the PDP 10 as described above, it was found that a preferable P ratio of a YPV phosphor in which the persistence time of red light was 3.5 msec or less was at least 0 at. % but less than 75 at. %. Furthermore, it was found that in order to obtain a shorter persistence time of 3.0 msec or less, the P ratio should be at least 0 at. % but less than 70 at. %. Subsequently, from the viewpoints of luminance and the total number of photons, the optimal P ratio of the YPV phosphor was studied.

TABLE 3

| | P Ratio (at. %) | | | | | | | | | | |
|---|---|---|---|---|---|---|---|---|---|---|---|
| | 0 | 10 | 20 | 30 | 40 | 50 | 60 | 70 | 80 | 90 | 100 |
| Red Color Tone | ◎ | ◎ | ◎ | ◎ | ◎ | ○ | ○ | ○ | ○ | ○ | X |
| Persistence Time (<3.5 msec) | ◎ | ◎ | | ○ | | ○ | | | Δ | | X |
| PDP Luminance | X | X | X | Δ | Δ | ○ | ◎ | ◎ | ◎ | Δ | Δ |
| Total Number of Photons | X | X | X | X | Δ | ○ | ◎ | ◎ | ◎ | ○ | Δ |
| Comprehensive Evaluation | X | X | X | X | Δ | ○ | ◎ | ◎ | ○ | X | X |

In Table 3, ◎ indicates "excellent", ○ "good", Δ "acceptable", and X "not acceptable".

Table 3 shows the aforementioned experimental results together with respect to the YPV phosphors and shows the evaluation results of the red color tone, persistence time, PDP luminance, and the total number of photons with respect to the P ratios of the YPV phosphors.

As can be understood from FIG. 17 and Table 3, YPV phosphors with a large total number of photons of red light and high photon conversion efficiency are the YPV phosphors with a P ratio of at least 50 at. % but not more than 90 at. %, preferably at least 60 at. % but less than 90 at. %, and more preferably at least 60 at. % but not more than 80 at. %.

For the purpose of obtaining high-output red light with a persistence time of 3.0 msec or less, it is preferable that a YPV phosphor with high photon conversion efficiency and a high P ratio be used. Therefore, with consideration given to the balance between the persistence time and the total number of photons, it is more preferable that the P ratio be at least 50 at. % but less than 75 at. % with reference to FIGS. 15 and 17 and the comprehensive evaluations in Table 3.

The above results show that an excellent color purity and a persistence time of 3.5 msec or less can be achieved when the red phosphor is an $Eu^{3+}$-activated red phosphor that emits red light that has its main emission peak in a wavelength range of not less than 610 nm and less than 630 nm and in which the maximum intensity of an orange emission component in a wavelength range of not less than 580 nm and less than 600 nm is at least 2% but lower than 20% of the intensity at the main emission peak. The maximum intensity of the above-mentioned orange emission component is preferably lower than 15% and more preferably lower than 13% of the intensity at the main emission peak.

Such an $Eu^{3+}$-activated red phosphor to be used herein can be at least one phosphor selected from $Ln_2O_3{:}Eu^{3+}$ and $Ln(P,V)O_4{:}Eu^{3+}$ where Ln is at least one element selected from Sc, Y, and Gd, since they are mass-produced products and easily available.

When the PDP 10 is required to have a deep red color tone, it is preferable that the above-mentioned YPV phosphor be used alone as the red phosphor. When red luminance is required, it is preferable that either a YOX phosphor that emits red light with high spectral luminous efficacy or $(Y,Gd)_2O_3{:}Eu^{3+}$ (hereinafter referred to as a YGX phosphor) be used alone as the red phosphor.

Furthermore, when the red color tone is considered as important and a higher luminance than that obtained by using the YPV phosphor alone is required, the spectral luminous efficacy of red light may be improved with a mixed red phosphor that contains at least one of the YOX phosphor and the YGX phosphor added to the YPV phosphor. On the contrary, when the red luminance is considered as important and a better red color tone than that obtained by using the YOX phosphor or the YGX phosphor alone is required, the spectral luminous efficacy of red light may be improved with a mixed red phosphor that contains a YPV phosphor added to the YOX phosphor or the YGX phosphor.

Particularly desirably, the above-mentioned $Eu^{3+}$-activated red phosphor contains a $Ln(P,V)O_4:Eu^{3+}$ phosphor and the atomic ratio of P/(P+V) is at least 50 at. % but less than 75 at. %.

A PDP may be provided with an optical filter (for example, an optical filter designed optically so as to excessively absorb an orange light component at least in the vicinity of a wavelength of 590 nm to 595 nm) that absorbs an orange light component. In this case, after red light has passed through the optical filter, the red light of an $Eu^{3+}$-activated red phosphor may have its main emission peak in a wavelength range of not less than 610 nm and less than 630 nm, and the maximum intensity of the orange emission component may be at least 2% but lower than 20% of the maximum intensity of the red component. A combination of a red phosphor and an optical filter makes it possible not only to reduce the output of orange light emitted by a neon (Ne) discharge but also to lower the output ratio of the orange light component in the vicinity of 593 nm emitted by the $Eu^{3+}$-activated red phosphor. As a result, the contrast and red color tone of color images are improved.

When the plasma display device is provided with an optical filter that absorbs an orange light component, the longer the $1/10$ persistence time of red light, which has passed through the optical filter, within a range of 3.5 msec or less, the better, and the $1/10$ persistence time is preferably longer than 2.3 msec but not longer than 3.5 msec.

6. Composition of Blue Phosphor

In a plasma display device, phosphors other than the green phosphor also are required to have short persistence and to be excellent in luminance, luminance degradation resistance, and color tone. In this embodiment, as long as the persistence properties, luminance, luminance degradation resistance, and color tone are at suitable levels for stereoscopic image devices, the blue phosphor to be used is not particularly limited. Preferably, the blue phosphor used in this embodiment is an $Eu^{2+}$-activated blue phosphor having its main emission peak in a wavelength range of not less than 420 nm and less than 500 nm. Such a blue phosphor with $Eu^{2+}$ used as an activator emits light based on a $4f^65d^1 \rightarrow 4f^7$ electron energy transition (i.e. a parity allowed transition) of $Eu^{2+}$ ions. Therefore, blue light emission with short persistence, specifically less than 1 msec, can be obtained. Furthermore, such an $Eu^{2+}$-activated blue phosphor is excellent in luminance, luminance degradation resistance, and color purity.

More specific examples of the blue phosphor include a BAM phosphor, $CaMgSi_2O_6:Eu^{2+}$ (a CMS phosphor), and $Sr_3MgSi_2O_8:Eu^{2+}$ (a SMS phosphor).

7. Specific Configuration Example

Hereinafter, an example is described in which a plasma display device 100 of this embodiment was produced. The red phosphor used herein was a YPV phosphor whose P ratio was set at 67 at. %. This phosphor emits red light that has its main emission peak in a wavelength range of not less than 610 nm and less than 630 nm and in which the maximum intensity of an orange emission component in a wavelength range of not less than 580 nm and less than 600 nm is 18.0% of the main emission peak. For the mixed green phosphor, a ZSM phosphor in which the amount of Mn activator was set at 8 at. % was used as the short persistence $Mn^{2+}$-activated green phosphor and a YAG phosphor was used as the $Ce^{3+}$-activated green phosphor. The persistence time of the ZSM phosphor in which the amount of Mn activator was set at 8 at. % is 3.7 msec, and the mixing ratio of the YAG phosphor is 15 mol % in the mixed green phosphor. A BAM phosphor was used as the blue phosphor.

Figure 18:
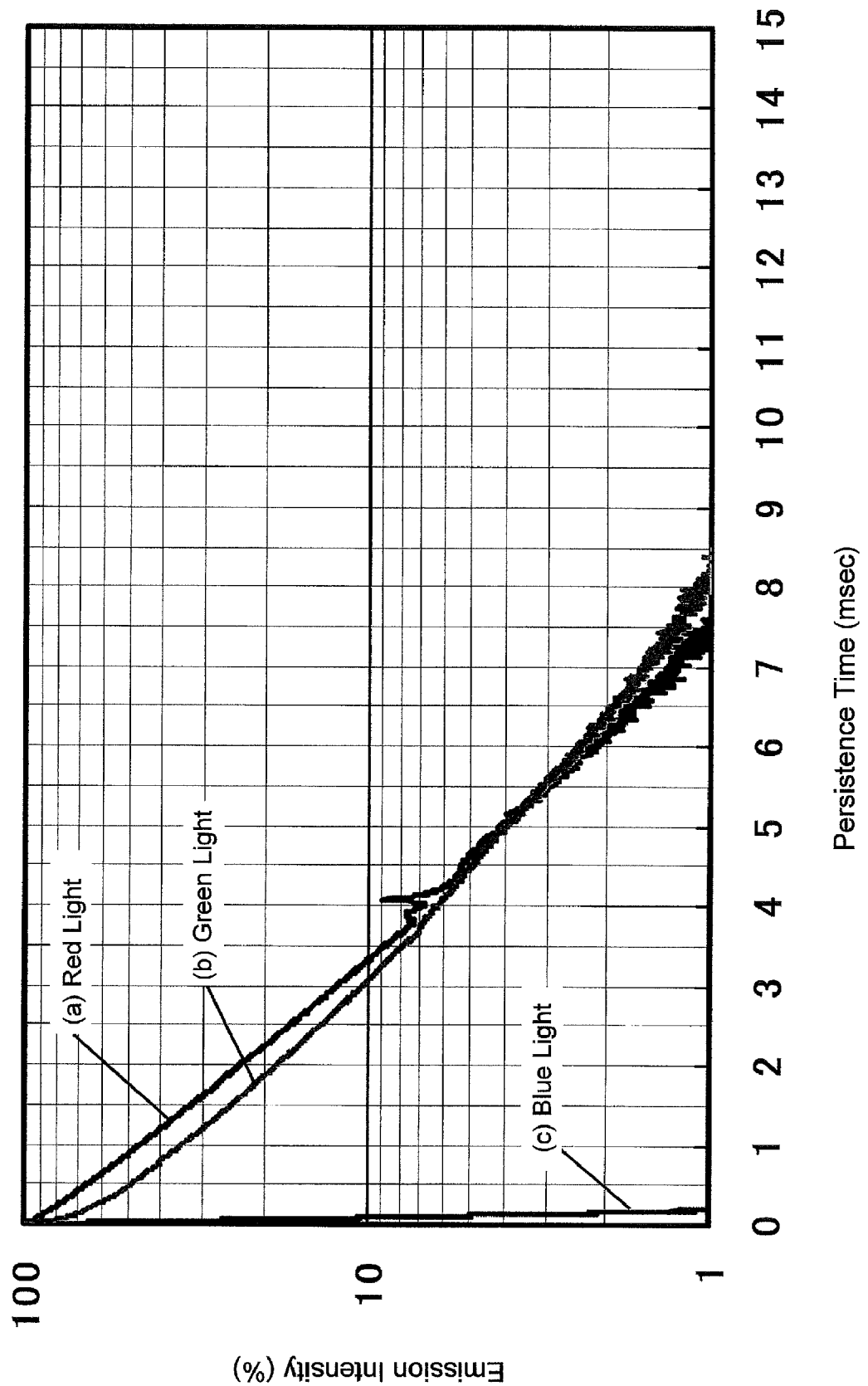
FIG. 18 is a diagram showing persistence properties of red light, green light, and blue light of a plasma display device according to a specific configuration example.

The plasma display device 100 of the embodiment was produced using these phosphors. FIG. 18 shows the persistence properties of red light (a), green light (b), and blue light (c) of the plasma display device.

According to FIG. 18, the persistence times of the red light, green light, and blue light were 3.3 msec, 3.0 msec, and 1 msec or less, respectively. Furthermore, they were evaluated with respect to the luminance, luminance maintenance rate, and color tone and as a result, they were in acceptable levels as products.

It is obvious that both the persistence time of the green light and that of the red light shown in FIG. 18 are allowed to be 3.0 msec or less by material design.

As described above, according to the plasma display device of the aforementioned embodiment, it was proved that a plasma display device was produced with a high luminance, excellent color image quality, and excellent lifetime properties with less luminance degradation even in the case of prolonged lighting. When a stereoscopic image display device is configured using the plasma display device, an eye-friendly stereoscopic image display is possible in which no crosstalk, which is a phenomenon in which a double image is produced, occurs even when a liquid crystal shutter is switched at 120 Hz.

8. Application Example

In FIG. 18, the persistence time of green light is less than the persistence time of red light. The red light is inferior to green light in spectral luminous efficacy, and the persistence component of the red light also is perceived darker. Therefore, in the specific configuration example, crosstalk of green light with high spectral luminous efficacy is inhibited and thereby especially tends not to be conspicuous. Accordingly, when the persistence time of red light is set to be more than the persistence time of green light, red light emitted by the $Eu^{3+}$-activated red phosphor is allowed to have a relatively high luminance, and the PDP 10 can have a higher luminance without crosstalk being perceived, which is advantageous. The persistence time of red light is preferably longer than the persistence time of green light within a range of 3.5 msec or less, but there are no practical problems even when the persistence time of red light is less than 4 msec.

Thus, with the use of the aforementioned phosphors, a stereoscopic image display device can be configured that emits blue light, green light, and red light and alternately displays an image for the left eye and an image for the right eye on an image display surface to allow the parallax to be perceived from the images perceived by the left eye and the right eye and thus a stereoscopic image to be perceived, wherein the $1/10$ persistence time of the green light is less than that of at least one of the blue light and the red light, and the longest $1/10$ persistence time of the light components of the blue light, the green light, and the red light is less than 4.0 msec, particularly less than 3.5 msec. In the stereoscopic image display device, crosstalk of green light with high spectral luminous efficacy is inhibited and therefore crosstalk tends not to be conspicuous.

The stereoscopic image display device can be configured as a plasma display device. That is, the stereoscopic image display device includes a plasma display panel in which a pair of substrates at least whose front side is transparent are disposed to oppose each other so as to form a discharge space between the substrates, barrier ribs for dividing the discharge space into a plurality of discharge spaces are disposed on at least one of the substrates, electrode groups are disposed on the substrates so as to produce discharge in the discharge spaces divided with the barrier ribs, and a red phosphor layer that emits red light, a green phosphor layer that emits green light, and a blue phosphor layer that emits blue light by the discharge are provided.

9. Characteristics of Embodiment

Characteristic points in the above-mentioned embodiment are described below. The above-mentioned embodiment is not limited by the following desirable characteristics.

The characteristics of the embodiment are described as follows. That is, a plasma display device includes a plasma display panel in which a pair of substrates at least whose front side is transparent are disposed to oppose each other so as to form a discharge space between the substrates, barrier ribs for dividing the discharge space into a plurality of discharge spaces are disposed on at least one of the substrates, electrode groups are disposed on the substrates so as to produce discharge in the discharge spaces divided with the barrier ribs, and a green phosphor layer that emits light by the discharge is provided, wherein the green phosphor layer includes a mixed phosphor containing a short persistence $Mn^{2+}$-activated green phosphor with a $1/10$ persistence time of more than 2 msec but less than 5 msec and either a $Ce^{3+}$-activated green phosphor or an $Eu^{2+}$-activated green phosphor that has a light emission peak in a wavelength range of not less than 490 nm and less than 560 nm.

This makes it possible to provide a plasma display device that is suitable for, for example, a stereoscopic image display device and that has short persistence light emission properties with respect to the green phosphor, high luminance, excellent color image quality, and excellent lifetime properties with less luminance degradation even in the case of prolonged lighting.

In the plasma display device, it is desirable that the short persistence $Mn^{2+}$-activated green phosphor be a $Mn^{2+}$-activated zinc silicate green phosphor, and at least 6.5 at. % but less than 10 at. % of zinc atoms in the $Mn^{2+}$-activated zinc silicate green phosphor have been substituted by manganese.

The $Mn^{2+}$-activated zinc silicate green phosphor has a $1/10$ persistence time of more than 2 msec but less than 5 msec and an excellent green color purity of emission light. In the mixed green phosphor, the ratio of the $Mn^{2+}$-activated zinc silicate green phosphor can be increased, which is advantageous in obtaining both an excellent green color purity and a short persistence time, specifically, 3.5 msec or less.

In the plasma display device, the short persistence $Mn^{2+}$-activated green phosphor is desirably a $Mn^{2+}$-activated zinc silicate green phosphor that emits green light and has a $1/10$ persistence time of less than 4.0 msec.

This allows the persistence time of a green phosphor with particularly high spectral luminous efficacy to be shortened without impairing color tone, and thereby a plasma display device that further inhibits crosstalk in a stereoscopic image display can be provided.

In the plasma display device, it is desirable that the $Ce^{3+}$-activated green phosphor be a $Ce^{3+}$-activated yttrium aluminum garnet phosphor and the $Ce^{3+}$-activated yttrium aluminum garnet phosphor be contained in the mixed phosphor in an amount of at least 3 mol % but not more than 40 mol %.

This is advantageous in satisfying the overall properties of the luminance, color tone, short persistence time, and further luminance maintenance rate as lifetime, of the green phosphor.

In the plasma display device of the present invention, the $1/10$ persistence time of green light is desirably 3.0 msec or less.

In this case, occurrence of crosstalk in a stereoscopic image display further is inhibited.

In a preferable embodiment of the plasma display device, the plasma display panel further includes a red phosphor layer that emits light by the discharge and a blue phosphor layer that emits blue light by the discharge, the red phosphor layer contains an $Eu^{3+}$-activated red phosphor that emits red light that has its main emission peak in a wavelength range of not less than 610 nm and less than 630 nm and in which the maximum intensity of an orange emission component in a wavelength range of not less than 580 nm and less than 600 nm is at least 2% but lower than 20% of the intensity at the main emission peak, and the blue phosphor layer contains an $Eu^{2+}$-activated blue phosphor having its main emission peak in a wavelength range of not less than 420 nm and less than 500 nm.

This makes it possible to provide a plasma display device that has light emission properties with short persistence with respect to the green phosphor, the red phosphor, and the blue phosphor, that has a high luminance, excellent color image quality, and excellent lifetime properties with less luminance degradation even in the case of prolonged lighting, and that is suitable for, for example, a stereoscopic image display device.

In the plasma display device, it is desirable that the $Eu^{3+}$-activated red phosphor contain a $Ln(P,V)O_4:Eu^{3+}$ phosphor, the Ln be at least one element selected from Sc, Y, and Gd, and the atomic ratio of P/(P+V) be at least 50 at. % but less than 75 at. %.

This allows the red phosphor to have an excellent color tone and thereby both a high luminance and short persistence can be obtained.

Desirably, the plasma display device is provided with an optical filter that absorbs an orange light component, and the red light that has passed through the optical filter has a $1/10$ persistence time of more than 2.3 msec but not more than 3.5 msec.

This also allows the red phosphor to have an excellent color tone and thereby both a high luminance and short persistence can be obtained.

In the plasma display device, it is desirable that the $1/10$ persistence time of the red light be more than that of the green light.

This inhibits crosstalk of the green light with high spectral luminous efficacy and thereby a plasma display device with a high luminance in which crosstalk tends not to be conspicuous can be provided.

INDUSTRIAL APPLICABILITY

As described above, the present invention makes it possible to obtain a plasma display device with short persistence properties in which high color gamut display can be achieved at a high luminance, and the plasma display device is useful for a high definition image display device, a stereoscopic image display device, and the like.

The invention claimed is:

1. A plasma display device comprising a plasma display panel in which a pair of substrates at least whose front side is transparent are disposed to oppose each other so as to form a discharge space between the substrates, barrier ribs for dividing the discharge space into a plurality of discharge spaces are disposed on at least one of the substrates, electrode groups are disposed on the substrates so as to produce discharge in the discharge spaces divided with the barrier ribs, and a green phosphor layer that emits light by the discharge is provided, wherein the green phosphor layer comprises a mixed phosphor containing a short persistence $Mn^{2+}$-activated green phosphor with a 1/10 persistence time of more than 2 msec but less than 5 msec and either a $Ce^{3+}$-activated green phosphor or an $Eu^{2+}$-activated green phosphor that has a light emission peak in a wavelength range of not less than 490 nm and less than 560 nm.

2. The plasma display device according to claim 1, wherein the short persistence $Mn^{2+}$-activated green phosphor is a $Mn^{2+}$-activated zinc silicate green phosphor, and at least 6.5 at. % but less than 10 at. % of zinc atoms in the $Mn^{2+}$-activated zinc silicate green phosphor have been substituted by manganese.

3. The plasma display device according to claim 1, wherein the short persistence $Mn^{2+}$-activated green phosphor is a $Mn^{2+}$-activated zinc silicate green phosphor that emits green light and has a 1/10 persistence time of less than 4.0 msec.

4. The plasma display device according to claim 1, wherein the $Ce^{3+}$-activated green phosphor is a $Ce^{3+}$-activated yttrium aluminum garnet phosphor and the $Ce^{3+}$-activated yttrium aluminum garnet phosphor is contained in the mixed phosphor in an amount of at least 3 mol % but not more than 40 mol %.

5. The plasma display device according to claim 1, wherein the 1/10 persistence time of green light is 3.0 msec or less.

6. The plasma display device according to claim 1, wherein the plasma display panel further comprises a red phosphor layer that emits light by the discharge and a blue phosphor layer that emits blue light by the discharge, the red phosphor layer contains an $Eu^{3+}$-activated red phosphor that emits red light that has its main emission peak in a wavelength range of not less than 610 nm and less than 630 nm and in which the maximum intensity of an orange emission component in a wavelength range of not less than 580 nm and less than 600 nm is at least 2% but lower than 20% of the intensity at the main emission peak, and the blue phosphor layer contains an $Eu^{2+}$-activated blue phosphor having its main emission peak in a wavelength range of not less than 420 nm and less than 500 nm.

7. The plasma display device according to claim 6, wherein the $Eu^{3+}$-activated red phosphor comprises a $Ln(P,V)O_4:Eu^{3+}$ phosphor, the Ln is at least one element selected from Sc, Y, and Gd, and the atomic ratio of P/(P+V) is at least 50 at. % but less than 75 at. %.

8. The plasma display device according to claim 6, wherein the plasma display device is provided with an optical filter that absorbs an orange light component, and the red light that has passed through the optical filter has a 1/10 persistence time of more than 2.3 msec but not more than 3.5 msec.

9. The plasma display device according to claim 6, wherein the 1/10 persistence time of the red light is more than that of the green light.

* * * * *